United States Patent
Shima et al.

(10) Patent No.: US 9,199,517 B2
(45) Date of Patent: Dec. 1, 2015

(54) TIRE AIR PRESSURE MONITORING DEVICE

(75) Inventors: Takashi Shima, Milton Keynes (GB); Syoji Terada, Hiratsuka (JP); Kazuo Sakaguchi, Ebina (JP)

(73) Assignee: Nissan Motor Co., Ltd., Yokohama (JP)

(*) Notice: Subject to any disclaimer, the term of this patent is extended or adjusted under 35 U.S.C. 154(b) by 133 days.

(21) Appl. No.: 14/008,270

(22) PCT Filed: Feb. 20, 2012

(86) PCT No.: PCT/JP2012/053971
§ 371 (c)(1),
(2), (4) Date: Oct. 25, 2013

(87) PCT Pub. No.: WO2012/140954
PCT Pub. Date: Oct. 18, 2012

(65) Prior Publication Data
US 2014/0172241 A1    Jun. 19, 2014

(30) Foreign Application Priority Data

Apr. 15, 2011  (JP) ................ 2011-090554
Apr. 21, 2011  (JP) ................ 2011-095374
Apr. 21, 2011  (JP) ................ 2011-095375
Apr. 25, 2011  (JP) ................ 2011-096673
Apr. 25, 2011  (JP) ................ 2011-096748

(51) Int. Cl.
*B60C 23/00*    (2006.01)
*B60C 23/04*    (2006.01)

(52) U.S. Cl.
CPC ......... *B60C 23/0422* (2013.01); *B60C 23/0416* (2013.01); *B60C 23/0488* (2013.01); *B60C 23/0489* (2013.01)

(58) Field of Classification Search
CPC ..................................... B60C 23/00
USPC ........................................... 701/49
See application file for complete search history.

(56) References Cited

U.S. PATENT DOCUMENTS

| 7,506,540 | B1* | 3/2009 | Job ............... | B60C 23/0416 340/447 |
| 8,436,724 | B2* | 5/2013 | Hannon ........... | B60C 23/0416 340/445 |
| 8,560,159 | B2* | 10/2013 | Wagner ........... | B60C 23/0416 340/426.33 |

(Continued)

FOREIGN PATENT DOCUMENTS

| JP | 2006-142873 A | 6/2006 |
| JP | 2007-237827 A | 9/2007 |

(Continued)

OTHER PUBLICATIONS

The Korean Office Action for the corresponding Korean Application No. 10-2013-7029941 issued on Jan. 19, 2015.

(Continued)

*Primary Examiner* — Thomas G Black
*Assistant Examiner* — Ana Thomas
(74) *Attorney, Agent, or Firm* — Global IP Counselors, LLP

(57) ABSTRACT

A tire air pressure monitor device is provided for monitoring air pressure in tires using pressure sensors, which are installed in the tire of each wheel. Each wheel has a transmitter for wirelessly transmitting the air pressure information along with a sensor ID when the wheel is at a predetermined rotation position. A vehicle body has a receiver for receiving the wireless signals. A wheel speed sensor is provided on a vehicle body for each wheel to determine the wheel rotation position. A TPMS control unit acquires the wheels rotation position when a wireless signal containing a certain sensor ID is transmitted. The TPMS control unit accumulates wheel rotation position data, and determines the wheel position corresponding to the wheel rotation position data having the smallest degree of dispersion from among the wheel rotation position data as the wheel position for the transmitter corresponding to the sensor ID.

19 Claims, 13 Drawing Sheets

(56) References Cited

U.S. PATENT DOCUMENTS

| | | | |
|---|---|---|---|
| 8,659,411 B2 | 2/2014 | Fink | |
| 2006/0012469 A1* | 1/2006 | Hirai | B60C 23/061 340/445 |
| 2014/0076040 A1* | 3/2014 | Shima | B60C 23/0416 73/146.5 |
| 2014/0088816 A1* | 3/2014 | Shima | B60C 23/0416 701/29.1 |
| 2014/0150543 A1* | 6/2014 | Shima | B60C 23/0416 73/146 |
| 2014/0167950 A1* | 6/2014 | Shima | B60C 23/0416 340/447 |
| 2014/0172241 A1* | 6/2014 | Shima | B60C 23/0416 701/49 |

FOREIGN PATENT DOCUMENTS

| | | |
|---|---|---|
| JP | 2007-245982 A | 9/2007 |
| JP | 2010-122023 A | 6/2010 |
| WO | 2010/034703 A1 | 4/2010 |

OTHER PUBLICATIONS

The Extended European Search Report for the corresponding European Application No. 12771426.9 issued on Feb. 13, 2015.

An English translation of the Russian Notice of Allowance for the corresponding Russian patent application No. 2013150776/11(079171) issued on Oct. 27, 2014.

* cited by examiner

TIRE AIR PRESSURE MONITORING DEVICE

CROSS-REFERENCE TO RELATED APPLICATIONS

This application is a U.S. National stage application of International Application No. PCT/JP2012/053971, filed Feb. 20, 2012, which claims priority under to Japanese Patent Application No. 2011-090554 filed in Japan on Apr. 15, 2011, Japanese Patent Application No. 2011-095374 filed in Japan on Apr. 21, 2011, Japanese Patent Application No. 2011-095375 filed in Japan on Apr. 21, 2011, Japanese Patent Application No. 2011-096673 filed in Japan on Apr. 25, 2011 and Japanese Patent Application No. 2011-096748 filed in Japan on Apr. 25, 2011.

BACKGROUND

1. Field of the Invention

The present invention relates to a tire air pressure monitoring device.

2. Background Information

Japanese Unexamined Patent Publication No. 2007-245982 discloses a technique for determining the wheel position of a transmitter for a tire air pressure sensor installed in a tire. Each tire is equipped with an inclination sensor, and a rotation position is stored as an inclination angle in association with a wheel position. The determination of the wheel position for the transmitter on the tire pressure sensor is made based on the inclination angle detected by the inclination sensor and the stored mapping between the inclination angle and the wheel position.

SUMMARY

Nevertheless, while the above-mentioned conventional technique holds true when the rotation speed of all four running tires are the same, in practice, given that the rotation speed for the four tires may differ especially due to the difference between inside and outside wheels while cornering, or when the wheels lock or slip, and so forth, the issue arises where the wheel position of the transmitter cannot be accurately determined.

An object of the present invention is to provide a tire air pressure monitor device capable of accurately determining the wheel position of the transmitter.

To achieve the above described object, the present invention accumulates as the rotation position data for the wheels the rotation position of the wheels acquired a plurality of times when a wireless signal is transmitted including a certain identification information; and determines the wheel position corresponding to the rotation position data having the smallest degree of dispersion from among the rotation position data as the wheel position for the transmitter corresponding to the identification information.

If a transmitter always transmits a wireless signal from a constant rotation position, the rotation position of the wheel to which that transmitter is attached will be a substantially constant value while the other rotation positions will vary from among the rotation position of the wheels detected at that time. Accordingly, the wheel position of the transmitter may be determined accurately by determining as the wheel position for the transmitter, the wheel position corresponding to the rotation position data having the least variance from among the rotation data for each wheel.

BRIEF DESCRIPTION OF THE DRAWINGS

Referring now to the attached drawings which form a part of this original disclosure.

FIG. 6 is a flow chart illustrating the mode selection control process that is carried out inside the TPMSCU in the first embodiment when the ignition is ON.

DETAILED DESCRIPTION OF THE EMBODIMENTS

The embodiments of the present invention will be explained below based on the drawings using each working example.

Embodiment 1

Figure 1:
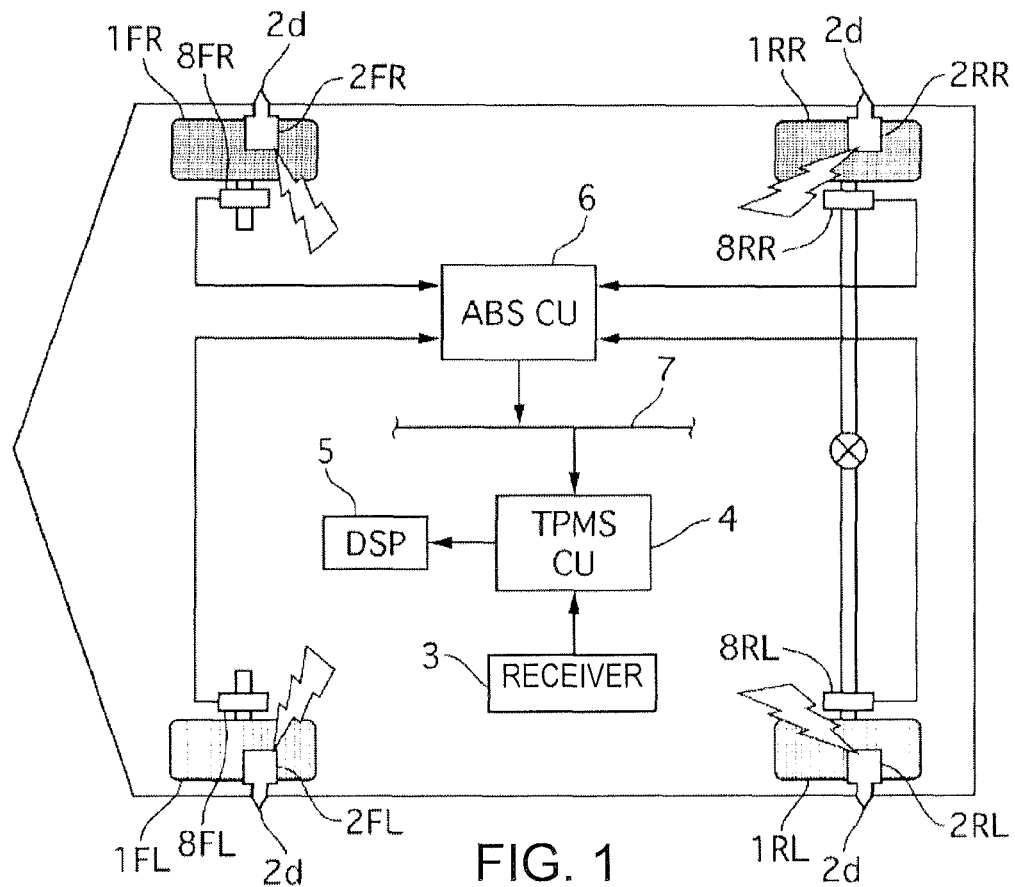
FIG. 1 is a configuration diagram of a tire air pressure monitor device in the first embodiment.

FIG. 1 is a configuration diagram of a tire air pressure monitor device in the first embodiment. In the drawing each reference numeral is suffixed with FL to indicate the front left wheel, FR to indicate the front right wheel, RL to indicate the rear left wheel and RR to indicate the rear right wheel. In the following explanation, the descriptions of FL, FR, RL, RR will be omitted when a separate description is unnecessary. The tire air pressure monitor device in the first embodiment is provided with a Tire Pressure Monitoring System (TPMS) sensor 2, a receiver 3, a TPMS control unit 4 (TPMSCU), a display 5, and a wheel speed sensor 8. Each of the wheels 1 has a TPMS sensor 2 mounted thereon, while the receiver 3, the TPMSCU 4, the display 5, and the wheel speed sensor 8 are provided on the vehicle body.

Figure 2:
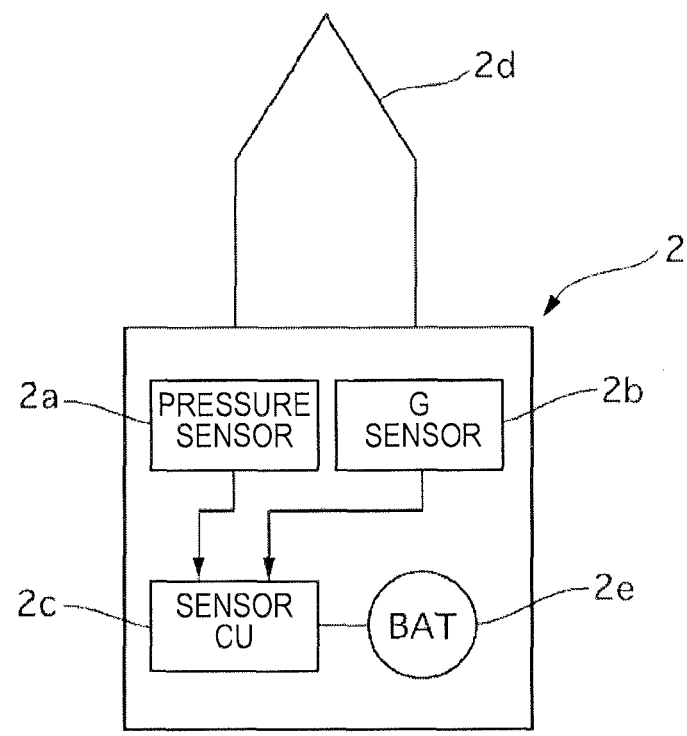
FIG. 2 is a configuration diagram of a TPMS sensor 2.

The TPMS sensor 2 is attached at the location of the tire air valve (not shown). FIG. 2 is a configuration diagram of the TPMS sensor 2. The TPMS sensor 2 is equipped with a pressure sensor (tire air pressure detection means) 2a, an accelerometer (G sensor) 2b, a sensor control unit (sensor CU) 2c, a transmitter 2d, and a button cell 2e. The pressure sensor 2a detects the air pressure (kPa) in the tire. The G sensor 2b detects the centrifugal acceleration (G) of the tire. The sensor control unit 2c operates on the electrical power supplied by the button cell 2e, and transmits TPMS data, that is, data containing the tire air pressure information detected by the pressure sensor, and the sensor identification information (ID), via wireless signals from the transmitter 2d. In the first embodiment the sensor IDs are numbered one (1) through four (4).

Figure 3:
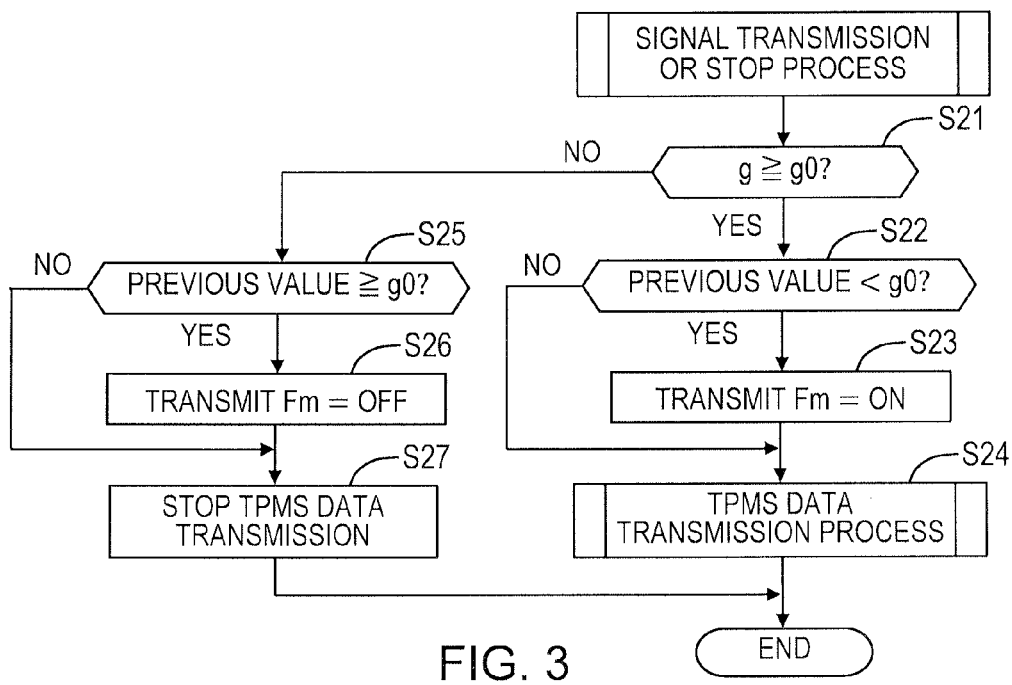
FIG. 3 is a flow chart illustrating the TPMS data transmission/TPMS data halt processes that occur inside the TPMS sensor in the first embodiment.

FIG. 3 is a flow chart illustrating the TPMS data transmission/TPMS data halt processes that occur inside the TPMS sensor in the first embodiment. In step S21, the sensor control unit 2c compares the centrifugal acceleration detected by the (3 sensor 2b with a predetermined travel-phase determination threshold; if the centrifugal acceleration is less than the travel-phase determination threshold the sensor control unit 2c determines that the vehicle is stopped and the control proceeds to step 25 where the sensor control unit 2c assesses whether or not the previous centrifugal acceleration g1 is no less than the travel-phase determination threshold g0. When the previous centrifugal acceleration g1 is greater than or equal to the travel-phase determination threshold g0, the sensor control unit 2c determines that this is immediately after the centrifugal acceleration g1 falls below the travel-phase determination threshold g0, and thus proceeds to step S26. The sensor control unit 2c transmits an OFF signal for a motion flag Fm one time for notifying the TPMSCU 4 of the termination of the transmission of wireless signals. The sensor control unit 2c proceeds to step S27 and halts the transmission of TPMS data.

Meanwhile, if the centrifugal acceleration is greater than or equal to the travel-phase determination threshold in step S21, the sensor control unit 2c determines that the vehicle is moving, and proceeds to step S22 to assess whether or not the previous centrifugal acceleration g1 is less than the travel-phase determination threshold g0. When the previous centrifugal acceleration g1 is less than the travel-phase determination threshold g0, the sensor control unit 2c determines that this is immediately after the centrifugal acceleration g1 exceeds the travel-phase determination threshold g0 and proceeds to step S23. The sensor control unit 2c transmits an ON signal for the motion flag Fm one time for notifying the TPMSCU 4 of the start of the transmission of wireless signals. The sensor control unit 2c proceeds to step 24, carries out TPMS-data transmission processing, and transmits the TPMS data at prescribed times. The receiver 3 receives and decodes the wireless signals output from the TPMS sensors 2 and outputs the decoded signals to the TPMSCU 4.

The TPMSCU 4 reads each TPMS data, references the mappings between each sensor ID and each wheel position that is stored in the non-volatile memory 9 (refer to FIG. 7) to determine from the sensor ID in a given TPMS data which wheel position corresponds to the read TPMS data, and displays the tire air pressure included in the TPMS data as the air pressure for the corresponding wheel position. Further, when the tire air pressure decreases below a given lower limit, the TPMSCU 4 may change the display color, provide a blinking display or alert sound to alert the driver to the decrease in air pressure.

The ABS control unit 6 detects the wheel speed of each wheel 1 based on a wheel speed pulse from each wheel speed sensor 8; if a given wheel is trending towards locking the ABS control unit 6 operates an ABS actuator (not in view) to increase, decrease or maintain the wheel cylinder pressure for that wheel to thereby execute anti-skid brake control. The ABS control unit 6 outputs the count value for the wheel speed pulse at predetermined periods (for example, 20 msecs) to the controller area network (CAN) communication line. Each wheel speed sensor 8 is a pulse generator that generates a predetermined number z (for example z=48) wheel speed pulses for one rotation of the wheel; the wheel speed sensors 8 are constituted by a gear shaped rotor the synchronizes and rotates with the wheel 1, and a permanent magnet placed opposite the outer perimeter of the rotor on the vehicle body and a coil. When the rotor rotates, the toothed surface of the rotor crosses the magnetic field formed around the wheel speed sensor 8 to thereby change the magnetic flux thereat and generate an electromotive force; this voltage change is output to the ABS control unit 6 as a vehicle speed pulse signal.

In the above mentioned manner the TPMSCU 4 determines to which wheel the data the received in the TPMS data belongs based on the mapping between each sensor ID and each wheel position that is stored in the memory 9; therefore, when a tire rotation is performed while the vehicle is stopped, the mapping between each sensor ID and each wheel position no longer matches the actual mapping, and then it is not known what for which wheel the data corresponds to the in the TPMS data. Here, "tire rotation" means changing the mounting position of the tire to make sure the wear on the tire treads are even, and increase the life (tread life) of the tire. For example, generally for a passenger vehicle, the right and left tire positions are crossed and the front and rear tires switched.

However in the first embodiment, given that the mapping between each sensor ID and each wheel position are updated and stored to the memory 9 after the tire rotation, if it is possible a tire rotation was performed, the frequency for transmitting the TPMS data is modified in the TPMS sensors 2, and the determination of which wheel the TPMS sensors 2 belong is performed in the TPMSCU 4 based on the transmission frequency of the TPMS data and each wheel speed pulse.

Constant Position Transmission Mode

If the vehicle stop time immediately before the vehicle starts traveling is greater than or equal to a prescribed time (for example, 15 minutes), the sensor control unit 2c in the TPMS sensor 2 determines that it is possible that a tire rotation took place.

If the vehicle stop time immediately before the vehicle starts traveling is less than the prescribed time, the sensor control unit 2c operates in a "normal mode" where the TPMS data is transmitted at a constant interval to (for example, one-minute intervals). On the other hand, if the vehicle stop time is greater than or equal to the prescribed time, the sensor control unit 2c operates in a constant position transmission mode that has an interval (tb) shorter than the transmission interval for the normal mode, and sends TPMS data at a constant rotation position.

The sensor control unit 2c operates in the constant position transmission mode until the number of transmissions of TPMS data reaches a prescribed number of times (for example, 40 times), when the number of transmissions reaches the prescribed number of times, the sensor control unit 2c transitions to the normal mode. If it is determined that the vehicle is stopped before the number of transmissions of the TPMS data reaches the prescribed number of times, when the vehicle stop time is less than the prescribed time (15 minutes), the sensor control unit 2c continues in the constant position transmission mode until the number of transmissions reaches the prescribed number of times, and when the vehicle stop time is greater than or equal to the prescribed time, the sensor control unit cancels the continuation of the constant position transmission mode before the vehicle stopped and initiates a new constant position transmission mode.

Figure 4:
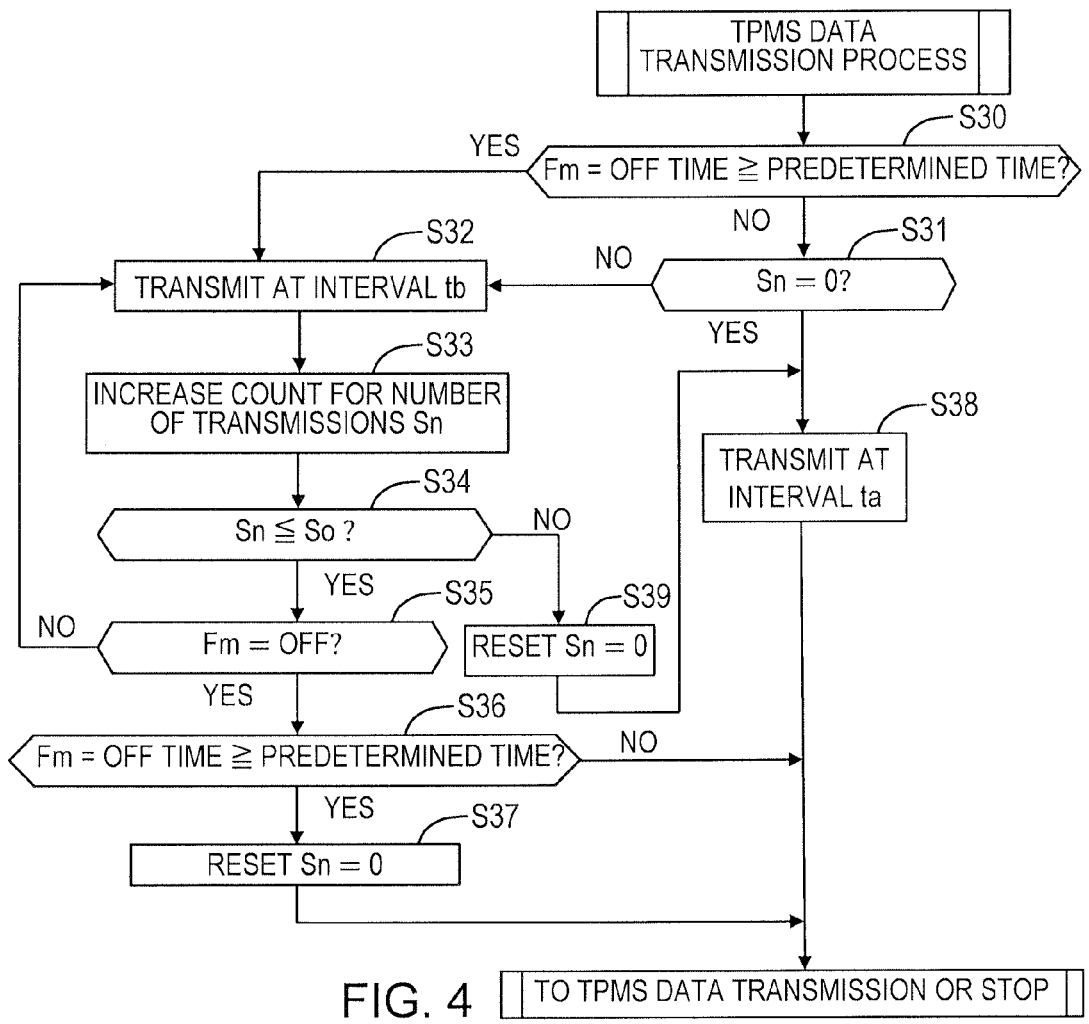
FIG. 4 is a flow chart illustrating the TPMS data transmission process that occurs inside the TPMS sensor in the first embodiment.

FIG. 4 is a flow chart illustrating the TPMS data transmission process that occurs inside the TPMS sensor in the first embodiment. In step S30 it is determined whether or not more of the OFF time for the motion flag Fm has passed than a prescribed time (for example, 15 minutes). When more than the predetermined time has passed, it is determined that it is possible a tire rotation took place and the control continues to step S32; when less than the predetermined time has passed the control continues to step S31 and it is determined whether or not the number of transmissions Sn is zero. When the number of transmissions Sn is zero, operation in constant position transmission mode is not necessary, and therefore the control continues to step S38 and the sensor control unit 2c operates in the normal mode transmitting TPMS data at a constant interval to (for example, one minute intervals).

In step S32, the sensor control unit 2c operates in constant position transmission mode transmitting TPMS data at a constant interval tb. In step S33, the count for the number of transmissions Sn is increased. In step S34, it is determined whether or not the number of transmissions Sn has reached a prescribed number of times (for example, 40 times). In other words, it is determined whether or not Sn≤S0; when Sn>S0, it is determined that the prescribed number of times is reached, and the control switches over to step S39, the number of transmissions Sn is reset to zero and the control transitions to step S38 and the sensor control unit 2c operates in normal mode. When Sn≤S0, in other words when it is determined that the prescribed number of times has not been reached the control continues to step S35.

In step S35, it is determined whether or not the motion flag Fm is OFF. If the motion flag Fm is OFF, the control continues to step S36, and at other times the control returns to step S32 and continues to increase the count on the number of transmissions Sn. In other words, the TPMS data transmission processing is initiated by turning ON the motion flag Fm, and thereafter, if the vehicle stops while the sensor control unit 2c is operating in the constant transmission mode, the transmission of the TPMS data stops and therefore the control acts as a monitor of that state.

In step S36, it is determined whether or not the time during which the motion flag Fm is OFF is greater than or equal to the prescribed time; when greater than or equal to the prescribed time has passed, the control continues to step S37, the count for the number of transmissions is reset to zero, and the sensor control unit 2c transitions to the TPMS data transmission/TPMS data halt processes. However, when less than the prescribed time has passed, the sensor control unit 2c continues to the TMPS data transmission and stops the process and once again determines again the TPMS data transmission/TPMS data halt processes without resetting the count on the number of transmissions.

Hereby, at the next time TPMS data is transmitted and the sensor control unit 2 is in constant position transmission mode, if the time the vehicle has stopped is not greater than or equal to the prescribed time, in other words, if no tire rotation took place given that the number of transmissions Sn has not been reset, the (constant position transmission mode) data received in up to partway through the previous constant position transmission mode may be used. Given that a large number of transmissions are made per constant time interval in the constant position transmission mode there is potential for consuming a lot of power. Accordingly, when there is no possibility that a tire rotation was performed, it is not that the prescribed number of transmissions are made once again, using the data transmitted in the previous constant position transmission mode reduces the number of transmissions and thus reduces the amount of power consumed.

During the constant position transmission mode, the sensor control unit 2c determines the transmission timing for the TPMS data during the constant position transmission mode based on the gravitational acceleration component of the centrifugal acceleration. The centrifugal acceleration of the TPMS sensor 2 varies with the acceleration and deceleration of the wheel 1, however, the gravitational acceleration component is always constant. On a wave pattern the highest point is represented by +1 (G), the lowest point is represented by −1 (G) and position at 90 degrees between the highest point and the lowest point is represented by zero. In other words, the TPMS sensor determines the rotation position by monitoring the size and direction of the gravitational acceleration dependence component of the centrifugal acceleration. Accordingly, for example, it is possible to constantly output the TPMS data at the highest point by outputting the TPMS data at the peak of the gravitational acceleration component.

Auto-Learning Mode

If the time that passes between OFF to ON of the ignition switch is greater than or equal to a prescribed time (for example, 15 minutes), the TPMSCU 4 determines that it is possible that a tire rotation took place. If the time that passes between the OFF and ON of the ignition switch is less than the prescribed time, the TPMSCU 4 enters a "monitoring mode" where the TPMSCU 4 monitors the air pressure of the tire on each wheel based on the air pressure information in the TPMS data transmitted from each of the TPMS sensors 2. On the other hand, when the time that passes between the OFF and ON of the ignition switch is greater than or equal to the prescribed time, the TPMSCU 4 enters an "auto-learning mode" where the TPMSCU 4 assesses the wheel position for each of the TPMS sensors 2. The TPMSCU 4 is in auto-learning mode until the wheel position of all the TPMS sensors 2 is assessed, or until a prescribed accumulated running time (for example, eight minutes) have passed since the start of the auto-learning mode. When the wheel position for all the TPMS sensors 2 has been assessed, or when the prescribed accumulated running time has passed, the TPMSCU 4 transitions to the monitoring mode.

Even during the auto-learning mode it is possible for the TPMSCU 4 to monitor the air pressure of the tire from the air pressure information included in the TPMS data; therefore, during the auto-learning mode the TPMSCU 4 may display the air pressure based on the mapping between each of the sensor IDs and each of the wheel positions currently stored in the memory 9, and warn the user regarding the decrease in air pressure.

Figure 5:
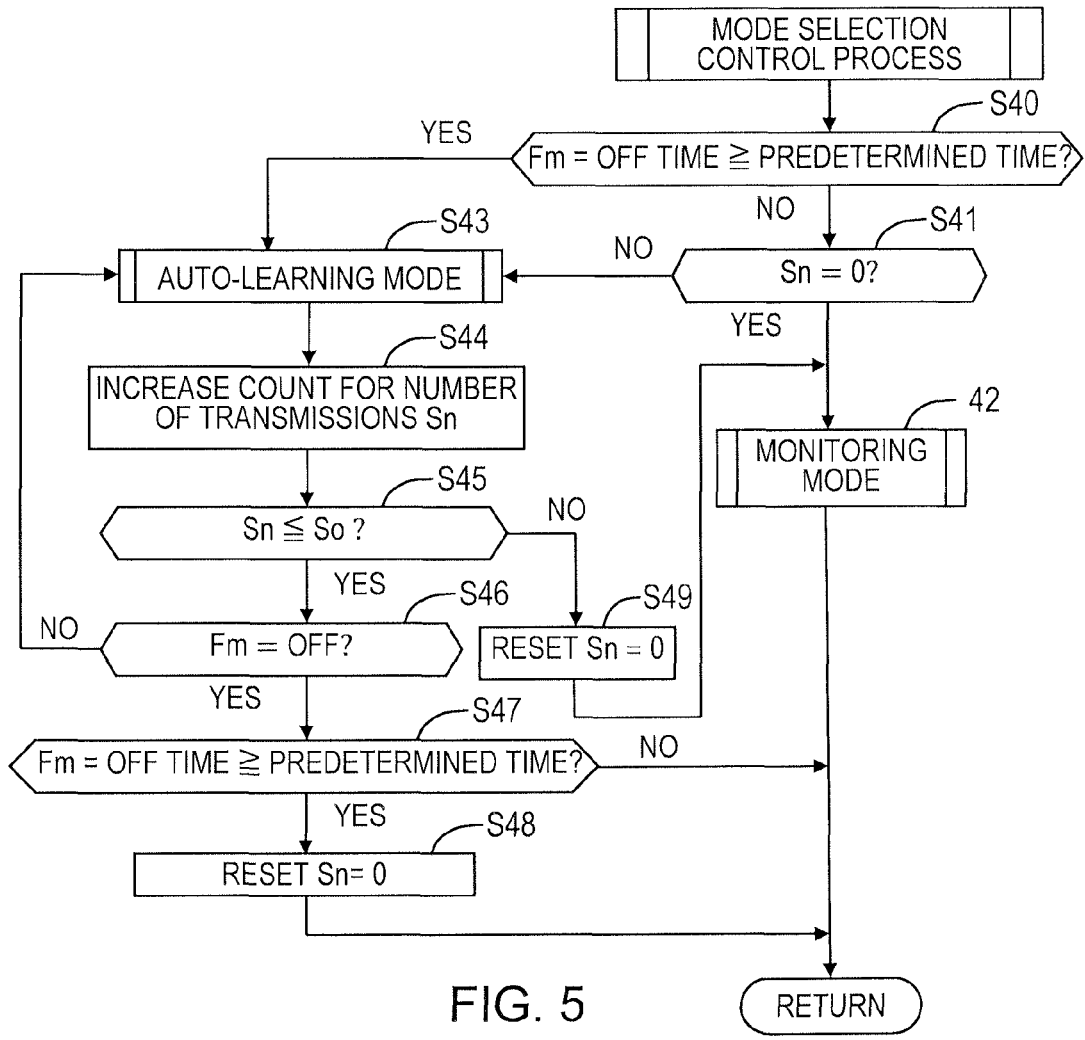
FIG. 5 is a flow chart illustrating the mode selection control process that is carried out inside the TPMSCU in the first embodiment.

FIG. 5 is a flow chart illustrating the mode selection control process that is carried out inside the TPMSCU in the first embodiment. The process inside the TPMSCU 4 for selecting the auto-learning mode, or the monitor mode is fundamentally carried out in the same way as the process of determination that takes place in the TPMS sensor 2. That is, the TPMS sensor 2 is able to transmit a signal but cannot receive because the information only flows in one direction. In other words, with its own pressure sensor 2a, and accelerometer 2b as inputs the TPMS sensor 2 transmits data for use in the monitoring mode and data for use in the auto learning mode based on the logic in the sensor control unit; and therefore the TPMSCU 4 needs to identify what state of information is being transmitted thereto.

In step S40 it is determined whether or not more of the OFF time for the motion flag Fm has passed than a prescribed time (for example, 15 minutes). When more than the predetermined time has passed, it is determined that it is possible a tire rotation took place and the control continues to step S43; when less than the predetermined time has passed the control continues to step S41 and it is determined whether or not the number of transmissions Sn is zero. There is no need to operate in constant position transmission mode when the number of transmissions is zero, and therefore the control continues to step S48 where the monitoring mode is selected.

In step S43, the auto-learning mode is selected. In step S44, the count for the number of transmissions Sn is increased (by one). In step S45, it is determined whether or not the number of receptions Sn has reached a prescribed number of times (for example, 40 times). In other words, it is determined whether or not Sn≤S0. When Sn>S0, it is determined that the prescribed number of times is reached, and the control proceeds to step S49, where the number of receptions Sn is reset to zero and the control transitions to step S42 and selects the monitoring mode. When Sn≤S0, in other words when it is determined that the prescribed number of times has not been reached the control continues to step S46. Moreover, the number of receptions Sn and the plurality of data received during this number of receptions Sn is written to non-volatile memory to thereby be saved. Accordingly, even when the ignition switch is OFF, the next time the ignition switch is ON the data saved may be effectively used without the data being reset.

In step S46, it is determined whether or not the motion flag Fm is OFF. If the motion flag Fm is OFF, the control continues to step S47, and at other times the control returns to step S43 and continues to increase the count on the number of receptions Sn. In other words, the TPMS data transmission processing is initiated by turning ON the motion flag Fm, and thereafter, if the vehicle stops while the sensor control unit 2c is operating in the constant transmission mode, the transmission of the TPMS data stops and therefore the control acts as a monitor of that state.

In step S46, it is determined whether or not the time during which the motion flag Fm is OFF is greater than or equal to the prescribed time. When greater than or equal to the prescribed time has passed, the control continues to step S47, the count for the number of receptions is reset to zero, and the control flow terminates. However when less than the prescribed time has passed the control flow is terminated without resetting the count on the number of transmissions. Moreover, this arrangement is not particularly limited; the control may immediately transition to the monitoring mode even if the number of receptions Sn has not reached a prescribed number of times, if it is possible to finalize the position mapping between each wheel position and the TPMS sensor 2.

Figure 6:
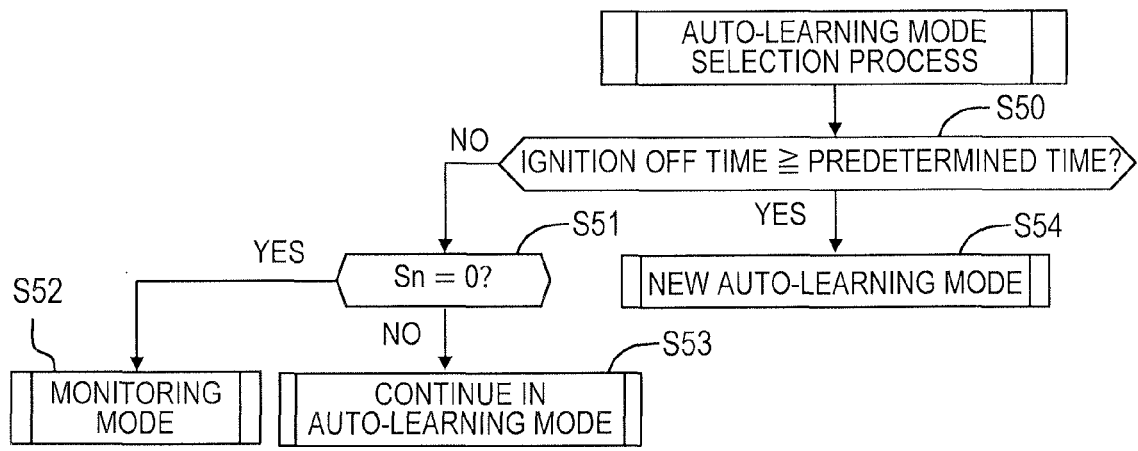

FIG. 6 is a flow chart illustrating the mode selection control process that is carried out inside the TPMSCU in the first embodiment when the ignition is on.

In step S50, it is determined whether or not greater than or equal to a prescribed time has passed since the motion flag Fm has been OFF; when greater than or equal to the prescribed time has passed it is determined that a tire rotation has taken place and the control continues to step S54 where a new auto-learning mode is initiated. Here, a new mode means that the operations in the auto-learning mode are executed using the data received during the current run without ever using the data received during the previous run. Moreover, when the motion flag Fm is turned off, after that, even if the ignition is turned off, only the counting of the time for which Fm=OFF continues. After the count terminates after reaching or exceeding the prescribed time, there is no reason to continue to count and therefore that the prescribed time has passed is recorded and the count is terminated.

In step S51, it is determined whether or not the number of receptions Sn is zero; when Sn is zero it is the case that the determination of the wheel position for each of the TPMS sensors 2 has already been completed from the previous run in the auto-learning mode because the time since the motion flag Fm has been turned off is shorter than the prescribed time. At this time, the TPMS sensor 2 transmits signals in normal mode. Accordingly, the control proceeds to step S52 and the TPMSCU 4 also selects the monitoring mode.

Meanwhile if the number of receptions is a number other than zero, the control proceeds to step S53 and continues in the auto-learning mode because it was the case that during the previous run the vehicle stopped while the TPMSCU 4 was operating in auto-learning mode. Here, to continue in auto-learning mode means that the operations in the auto-learning mode are executed using the data received during the previous run while using the data received during the current run. Hereby, it is possible to economize on the number of transmissions made during the constant position transmission mode of the TPMS sensor 2 and therefore control the amount of power consumed by the sensor.

The TPMSCU 4 receives input of the count value for the wheel speed pulse from the ABS control unit (ABSCU) 6 via the CAN communication bus 7 and carries out the kind of wheel position determination control illustrated below.

Wheel Position Determination Control

Figure 7:
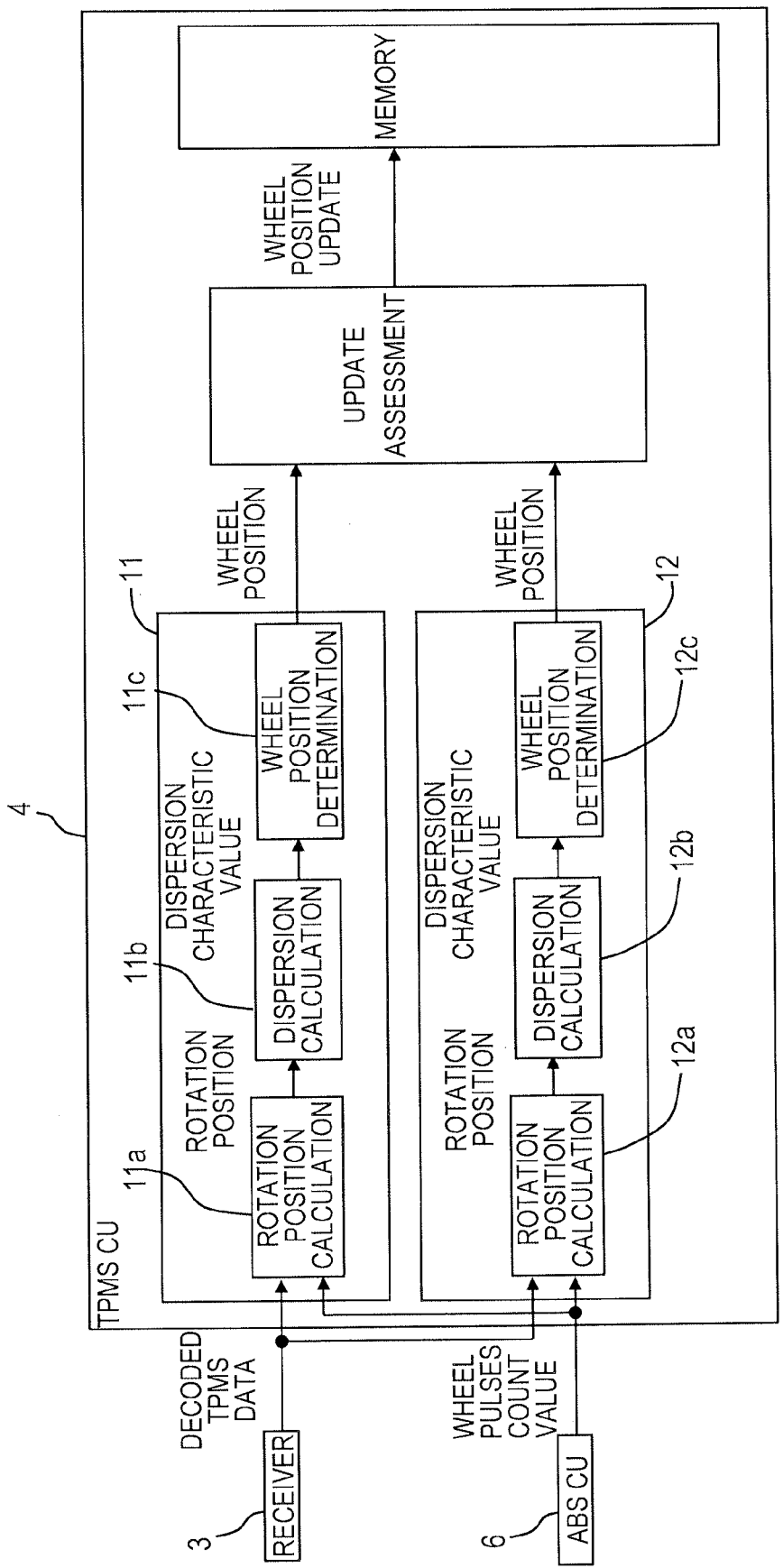
FIG. 7 is a control block diagram of the TPMSCU 4 that carries out wheel position determination control.

FIG. 7 is a control block diagram of the TPMSCU 4 for carrying out wheel position determination control. The TPMSCU 4 is provided with a first control unit (wheel position determination means) 11 for executing a first wheel position determination control and a second control unit (wheel position determination unit) 12 for executing a second wheel position determination control.

First Control Unit

The first control unit 11 is provided with a rotation position calculation unit (rotation position detection means) 11a, a dispersion calculation unit 11b, and a wheel position determination unit 11c.

The rotation position calculation unit 11a receives input of the decoded TPMS data output from the receiver 3, and the count value for each wheel speed pulse output from the ABS control unit 6 via the CAN communication line 7 and calculates the rotation position (number of rotor gear teeth) for each wheel when the rotation position for each TPMS sensor 2 is at the highest point. Here, the "number of rotor gear teeth" indicates which of the teeth of the rotor are being counted by the wheel speed sensor 8, and can be obtained by dividing the count value for the wheel speed pulse with the count value for one rotation of the tire. When the count value for the first wheel speed pulses is input to the rotation position calculation unit 11a after auto-leaning mode starts, the rotation position calculation unit 11a divides the count value by the number of gear teeth equivalent to one rotation, adds one (1) to the remainder and sets the resulting value as the reference number of gear teeth. For the second and subsequent times the rotation position calculation unit 11a determines the number of gear teeth based on the number of counts for the wheel speed pulse (the current count value minus the first count value) from the reference number of gear teeth.

Figure 8:
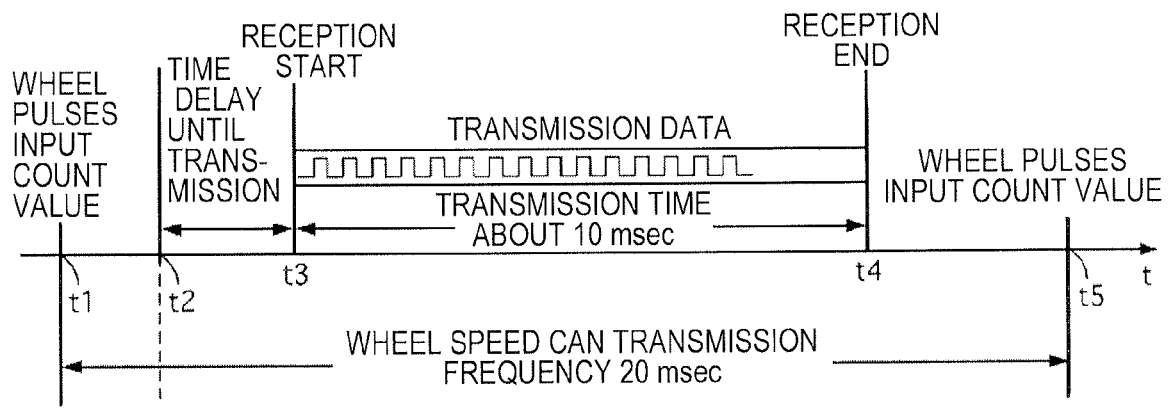
FIG. 8 is a diagram illustrating a method for computing the rotation position for the wheels 1.

FIG. 8 is a diagram illustrating a method for computing the rotation position for the wheels 1.

In FIG. 8, the t1 is the time the count value for the wheel speed pulse is input; t2 is the time that the rotation position of the TPMS sensor 2 is at the highest point; t3 is the time the TPMS sensor 2 actually starts the transmission of the TPMS data; t4 is the time the TPMSCU 4 finishes receiving the TPMS data; and t5 is the time the count value for the wheel speed pulse is input. At this point when t1, t4, t5 are actually measured (timed), t3 may be calculated by subtracting the data length (a defined value such as approximately 10 msec) of the TPMS data from t4 and t2 may be calculated by subtracting the time delay of the transmission time (this may be obtained by preliminary experimentation and so forth) from t3. Accordingly, if $z_{t1}$ is the number of gears at t1; $z_{t2}$ is the number of gears at t2; and $z_{t5}$ is the number of gears at t5, then:

$$(t2-t1)/(t5-t1)=(z_{t2}-z_{t1})(z_{t5}-z_{t1})$$

is true; and $$z_{t2}-z_{t1}=(z_{t5}-z_{t1})*(t2-t1)/(t5-t1)$$

Therefore, the number of gears zt2 at the time t2 when the TPMS sensor 2 is at the highest point in the rotation position is:

$$z_{t2}=z_{t1}+(z_{t5}-z_{t1})*(t2-t1)/(t5-t1)$$

The dispersion calculation unit 11b respectively stores for each sensor ID the rotation position for each of the wheels 1 calculated by the rotation position calculation unit 11a as the rotation position data, and calculates as a dispersion characteristic value, the degree of dispersion for each of the rotation position data for each sensor ID. The calculation of the dispersion characteristic value for a given sensor ID may be carried out by the rotation position calculation unit 11a whenever the rotation position is calculated.

Figure 9:
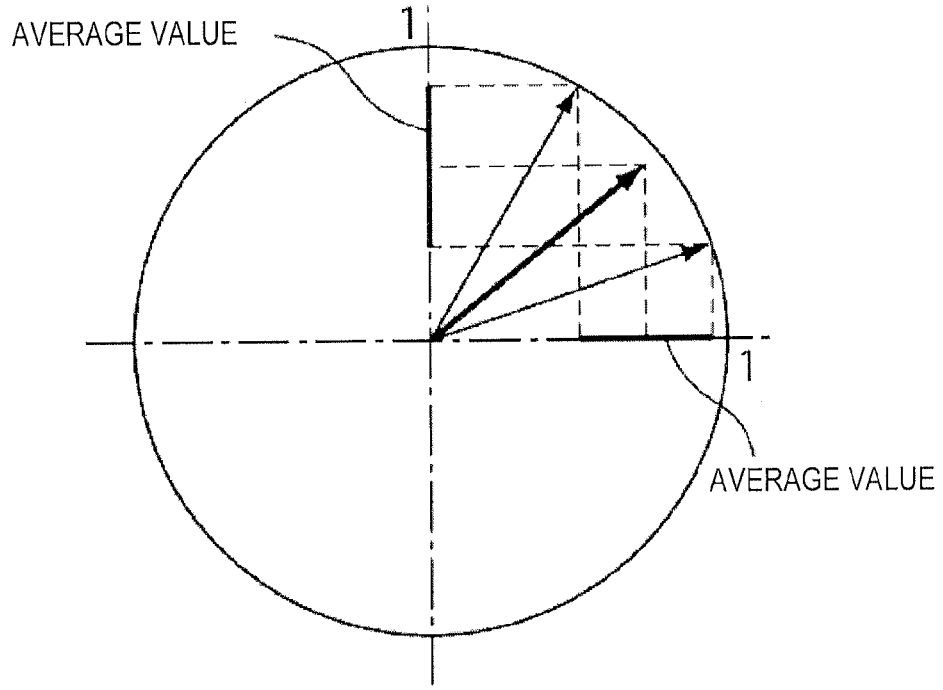
FIG. 9 is a diagram illustrating a method for computing the dispersion characteristic value.

FIG. 9 is a diagram illustrating a method for computing the dispersion characteristic value. In the first embodiment, consider a unit circle (a circle having a radius of one) in two dimensional plane where the center of the circle is at the origin (0, 0), and that θ (degrees) is the rotation position for the wheels 1 (θ=360×the number of rotor gear teeth/48); the rotation position of the wheels 1 may be converted to coordinates (cos θ, sin θ) on the circumference of unit circle. That is, the rotation position of each of the wheels 1 is viewed as a vector starts at the origin and ends at the coordinate (cos θ, sin θ) and has a length of 1; further, an average vector (ave_cos θ, ave_sin θ) is obtained for the vectors having the same rotation position data, and the scalar quantity of the average vector is computed as the dispersion characteristic value X1 for the rotation position data.

$$(\cos θ, \sin θ)=(\cos((z_{t2}+1)*2π/48), \sin((z_{t2}+1)*2π/48))$$

Therefore, if the number of receptions of TPMS data from the same sensor ID is n (n is a positive integer), then the average vector (ave_cos θ, ave_sin θ) is:

$$(\text{ave\_cos } θ, \text{ave\_sin } θ)=((Σ(\cos θ))/n,(Σ(\sin θ))/n)$$

and the dispersion characteristic value X can be represented as:

$$X=\text{ave\_cos } θ^2+\text{ave\_sin } θ^2$$

The wheel position determination unit 11c compares the dispersion characteristic value X at the rotation positions of the same sensor ID that is calculated by the dispersion calculation unit 11b. If the highest value for the dispersion characteristic value X is greater than a first threshold (0.57, for example) and the three remaining dispersion characteristic values X are all less than a second threshold (0.37, for example), the wheel position for the rotation position data corresponding to the highest-value dispersion characteristic value X, namely, the wheel position of the wheel speed sensor 8 that detected the rotation position data in question is determined to be the wheel position of the TPMS sensor 2 corresponding to the sensor ID in the rotation position data. This determination is carried out for all of the sensor IDs, to thereby determine the mapping between the sensor IDs and the wheel positions.

Second Control Unit

The second control unit 12 is provided with a rotation position calculation unit (rotation position detection means) 12a, a dispersion calculation unit 12b, and a wheel position determination unit 12c, and executes the later-described second wheel position determination control. Only the components that differ from the rotation position calculation unit 11a, the dispersion calculation unit 11b, and the wheel position determination unit 11c in the first control unit 11 will be explained below.

When one trip is defined as the period after the rotation position calculation unit 12a receives the on signal for the motion flag and until the rotation position calculation unit 12a receives an off signal, the rotation position calculation unit 12a receives the input of the decoded TPMS data output from the receiver 3 for the period from the start to the end of one trip, and the count value for each wheel speed pulse output from the ABS control unit 6 via the CAN communication line 7 and calculates the rotation position (number of rotor gear teeth) for each wheel when the rotation position for each TPMS sensor 2 is at the highest point. When the count value for the first wheel speed pulses is input to the rotation position calculation unit 12a after the start of one trip, the rotation position calculation unit 12a divides the count value by the number of gear teeth equivalent to one rotation, adds one (1) to the remainder and sets the resulting value as the reference number of gear teeth. For the second and subsequent times the rotation position calculation unit 12a determines the number of gear teeth based on the number of counts for the wheel speed pulse (the current count value minus the first count value) from the reference number of gear teeth. In other words, the reference number of gear teeth changes whenever the one trip starts.

The dispersion calculation unit 12b respectively stores for each sensor ID the rotation position for each of the wheels 1 calculated by the rotation position calculation unit 12a as the rotation position data, and calculates the degree of dispersion for each of the rotation position data for each sensor ID as the dispersion characteristic value Xtrpm. The dispersion characteristic value Xtrpm is computed for each trip. When a predetermined accumulated travel time has passed during one trip, that point in time is designated the end time for the one trip. Further, the dispersion characteristic value is not calculated if the number of receptions of the TPMS data during one trip is less than a predetermined value (three times, for example).

If the predetermined accumulated travel time has passed, the dispersion calculation unit 12b calculates the final dispersion characteristic value X based on the dispersion characteristic values Xtrp1, Xtrp2, . . . , Xtrpm calculated per trip. The final dispersion characteristic value X is obtained by multiplying a dispersion characteristic value Xtrp1, Xtrp2, . . . , Xtrpm by a weighted coefficient K1, K2, . . . , Km (where K1+K2+, . . . , +Km=1). Therefore, $$X = K1 \times Xtrp1 + K2 \times Xtrp2 Km \times Xtrpm$$

The weighted coefficients K1, K2, . . . , Km are obtained by dividing the number of receptions N1, N2, . . . , Nn of the TPMS data during one trip by the number of receptions N of TPMS data during the predetermined accumulated travel time. That is, the weighted coefficient Km is the ratio of the number of receptions Nn to the total number of receptions N; the greater the number of receptions Nn, the larger the value of the weighted coefficient. For a trip with less than three receptions where the dispersion characteristic value Xtrpm is not calculated, the TPMS data received during that time is removed from the TPMS data received during the predetermined accumulated travel time.

The wheel position determination unit 12c compares the final dispersion characteristic value X at the rotation positions of the same sensor ID that was calculated by the dispersion calculation unit 12b. If there is a highest value of the wheel position for the rotation position data corresponding to the highest-value dispersion characteristic value Xtrpm, namely, the wheel position of the wheel speed sensor 8 that detected the rotation position data in question is determined to be the wheel position of the TPMS sensor 2 corresponding to the sensor ID in the rotation position data in question. This determination is carried out for all the sensor IDs, to thereby determine the mapping between the sensor IDs and the wheel positions.

An update assessment unit 14 stores the mapping between the sensor ID and the wheel position determined by the first control unit 11 by performing a memory update of the memory 9, and stores the determination results from the second control unit 12 by performing a memory update of the memory 9 when there are mappings between the sensor IDs and the wheel positions that the first control unit 11 was unable to determine.

First Wheel Position Determination Control Process

Figure 10:
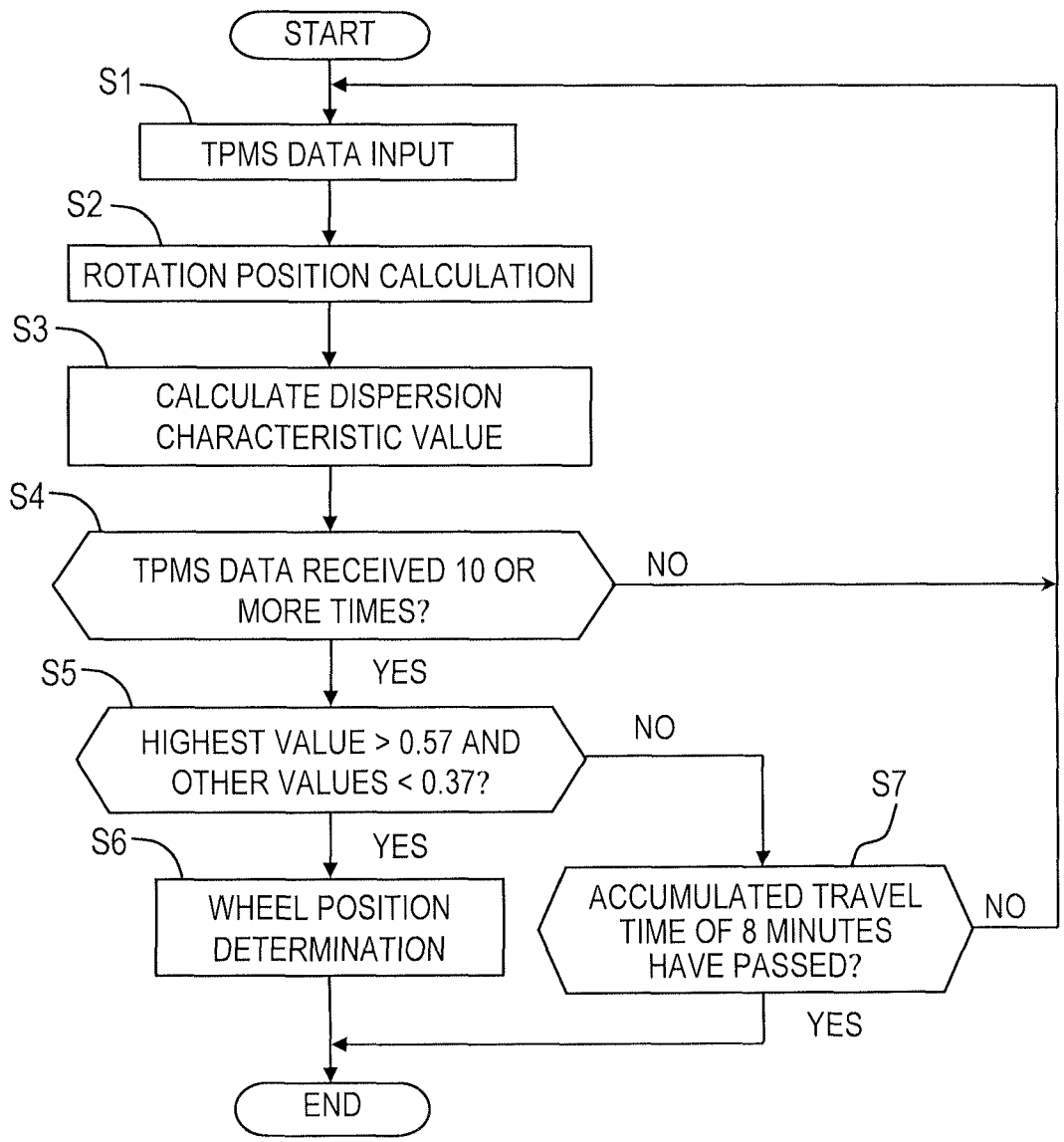
FIG. 10 is a flow chart illustrating the flow of the first wheel position determination control process in the first control unit 11.

FIG. 10 is a flow chart illustrating the flow of the first wheel position determination control process in the first control unit 11 and each step will be described below. The following description explains a case of the sensor having the sensor ID=1; however, the wheel position determination control process is also carried out in parallel for the other sensor IDs (ID=2, 3, 4).

In step S1, the rotation position calculation unit 11a receives the TPMS data for the sensor having the sensor ID=1.

In step S2, the rotation position calculation unit 11a calculates the rotation position for the wheels 1.

In step S3, the dispersion calculation unit 11b calculates the dispersion characteristic value for the rotation position data for the wheels 1.

In step S4, the control determines whether or not the TPMS data for the sensor having the sensor ID=1 was received no less that a predetermined number of times (10 times, for example); if YES, the control proceeds to step S5, and if NO the control returns to step S1. In step S5, the wheel position determination unit 11c determines whether or not the highest value for the dispersion characteristic value is greater than the first threshold of 0.57 and whether or not the remaining dispersion characteristic values are less than the second threshold value of 0.37; if YES, the control proceeds to step S6, and if NO the step proceeds to step S7.

In step S6, the wheel position determination unit 11c determines the wheel position of the rotation position data that corresponds to the highest-value dispersion characteristic value to be the wheel position for the sensor ID.

In step S7, the wheel position determination unit 11c determines whether or not a predetermined accumulated travel time (eight minutes, for example) has passed since the start of the auto-learning mode; if NO the control proceeds to step 1, and if YES the control ends.

[Second Wheel Position Determination Control Process]

Figure 11:
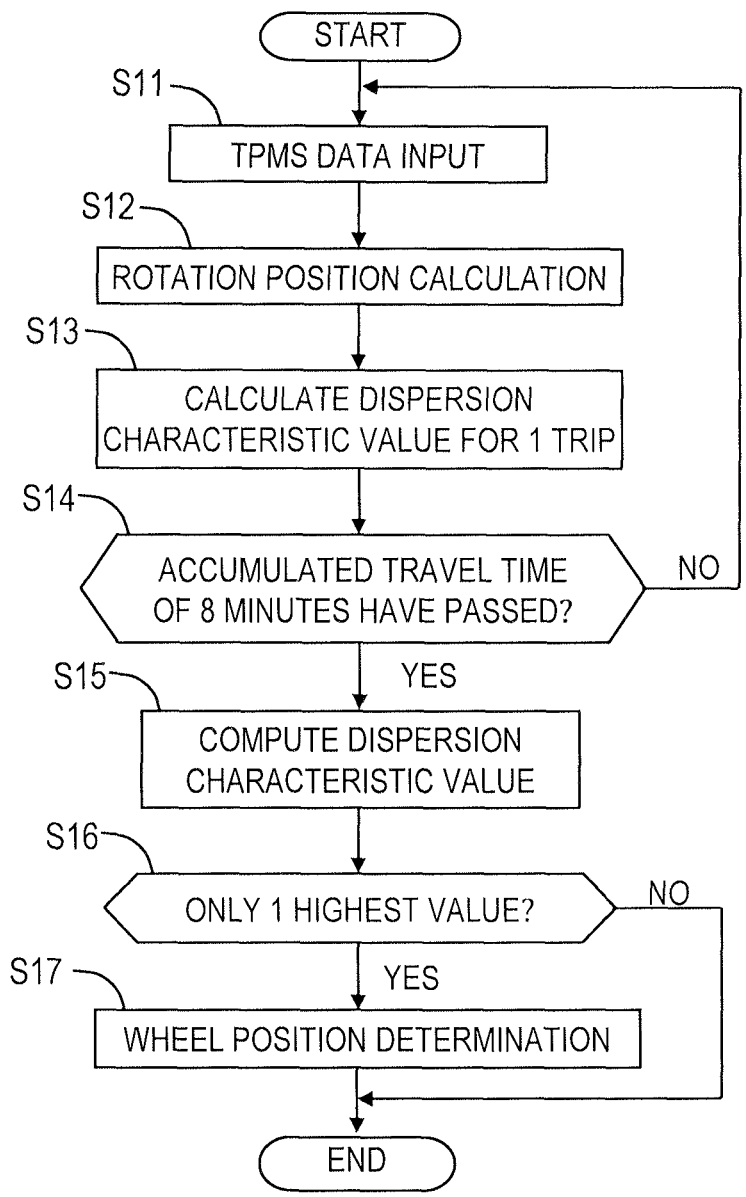
FIG. 11 is a flow chart illustrating the flow of the second wheel position determination control process in the second control unit 12.

FIG. 11 is a flow chart illustrating the flow of the second wheel position determination control process in the second wheel control unit. The following description explains a case of the sensor having the sensor ID=1; however, the wheel position determination control process is also carried out in parallel for the other sensor IDs (ID=2, 3, 4).

In step S11, the rotation position calculation unit 12a receives the TPMS data for the sensor having the sensor ID=1.

In step S12, the rotation position calculation unit 12a calculates the rotation position for the wheels 1.

In step S13, the dispersion calculation unit 12b calculates the dispersion characteristic value Xtrpm for one trip for the rotation position data for the wheels 1.

In step 14, the dispersion calculation unit 12b determines whether or not a predetermined accumulated travel time (eight minutes, for example) has passed since the start of the auto-learning mode; if YES the control proceeds to step S15, and if NO the control proceeds to step S11.

In step S15, the dispersion calculation unit 12b calculates the final dispersion characteristic value X.

In step S16, the wheel position determination unit 12c determines whether or not there is a single highest value; if YES the control proceeds to step S17, and if NO the control ends. The auto-learning mode ends when the control ends.

In step S17, the wheel position determination unit 12c determines the wheel position of the rotation position data that corresponds to the highest-value dispersion characteristic value to be the wheel position for the sensor ID.

The operations will be described next.

Wheel position determination using the dispersion of the rotation position data

If the vehicle stop time which is greater than or equal to 15 minutes immediately before the travel start time, it is determined that there is the possibility that a tire rotation took place, and the TPMS sensors 2 transitions from normal mode to constant position transmission mode. In the constant position transmission mode, the TPMS sensors 2 wait for 16 seconds to pass since the previous transmission, and transmit TPMS data when the rotation position is at the highest point.

Meanwhile the TPMSCU 4 transitions from monitoring mode to auto-learning mode when no less than 15 minutes have passed from the OFF to the ON of the ignition switch. In auto-learning mode the TPMSCU 4 executes the first wheel position determination control using the first control unit 11 and the wheel position determination control using the second control unit 12 in parallel as the wheel position determination control.

During the first wheel position determination control, whenever the TPMS data is received from TPMS sensors 2 the rotation position (number of rotor gear teeth) for the wheels 1 is calculated when the rotation position of the TPMS sensor 2 is at the highest point, for instance from the time the count value for the wheel speed pulse is input, or from the time the reception of the TPMS data is complete, and the like. When the TPMS data for the same sensor ID is received no less than 10 times, the dispersion characteristic values X for the rotation position data for the sensor ID are compared, and if the highest value for the dispersion characteristic value X is greater than the first threshold of 0.57 and the three remaining dispersion characteristic values X are less than the second threshold of 0.37, the wheel position of the rotation position data corresponding to the highest-value dispersion characteristic value X is determined as the wheel position for the sensor ID.

During the second wheel position determination control, if the wheels 1 are rotating in the same direction, whenever the TPMS data is received from the TPMS sensors 2, the rotation position (number of rotor gear teeth) for the wheels 1 is calculated when the rotation position of the TPMS sensor 2 is at the highest point and the dispersion for the rotation position data for one trip is computed, for instance from the time the count value for the wheel speed pulse is input, or from the time the reception of the TPMS data is complete, and the like. The dispersion for the rotation position in one trip is weighted in accordance with the number of receptions Nn of the TPMS data from the degree of dispersion obtained for each trip (dispersion characteristic value Xtrp1, Xtrp2, ... , Xtrpm) during the predetermined accumulated travel time (for eight minutes), and the final degree of dispersion (dispersion characteristic value X) is calculated for the wheels. The wheel position corresponding to the rotation position data having the smallest degree of dispersion is determined as the wheel position for the TPMS sensor 2.

While the vehicle is traveling, the rotation speed of the wheels will differ due to the difference between the inside and the outside wheels when cornering, as well as the locking or slippage of a wheel and the differences in the air pressure of the tire. Moreover, it is understood that even if the vehicle is traveling in a straight line, the rotation speed will differ between the front wheels 1FL, 1FR and the rear wheels 1RL, 1RR, and between the left wheels 1FL, 1RL and the right wheels 1FR, 1RR due to minor steering adjustments from the driver or the difference between a left or a right curve in the road and so forth. In other words, the TPMS sensor 2 and the (rotor teeth of the) wheel speed sensor 8 rotate together, and therefore, the rotation speed of the wheels with respect to the differences in travel, and the output frequency of the wheel speed sensor 8 of the same wheel is always in sync with (always matches) the output frequency of a given TPMS sensor 2 despite the travel distance and travel state.

Therefore, the wheel position of the TPMS sensors 2 may be accurately determined by observing the degree of dispersion of the rotation data for the wheels 1 with respect to the transmission frequency.

Figure 12:
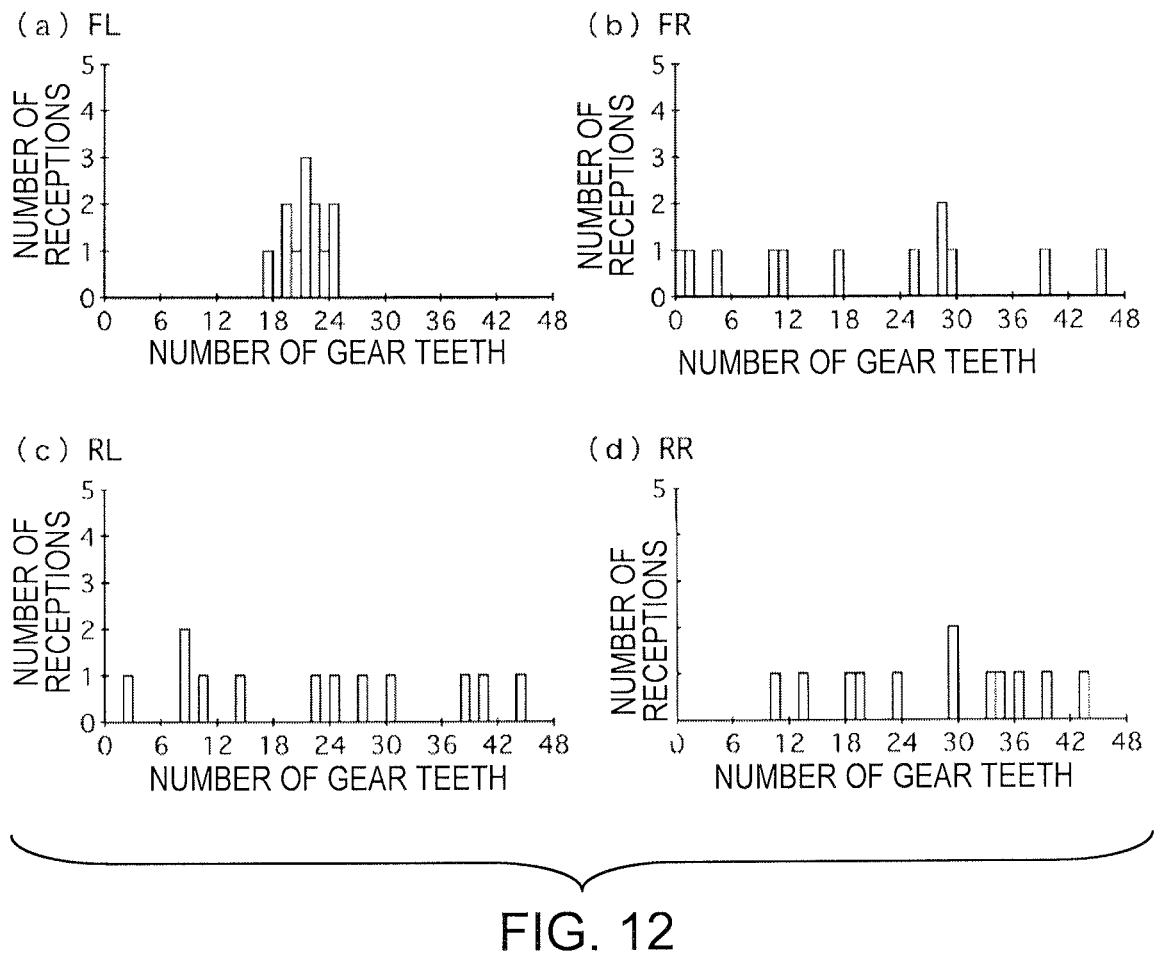
FIG. 12 illustrates the relationship between the number of times TPMS data is received and the rotation position (number of rotor gear teeth) for each of the wheels 1FL, 1FR, 1RL, 1RR when the TPMS sensor 2FL in the front left wheel 1FL is at the highest point.

FIG. 12 illustrates the relationship between the number of times TPMS data is received and the rotation position (number of rotor gear teeth) for each of the wheels 1FL, 1FR, 1RL, 1RR when the TPMS sensor 2FL in the front left wheel 1FL is at the highest point. FIG. 12(*a*) represents the wheel speed sensor 8FL for the front left wheel 1FL; (b) represents the wheel speed sensor 8FR for the front right wheel 1FR; (c) is the wheel speed sensor 8RL for the rear left wheel 1RL; and (d) represents the wheel speed sensor 8RR for the rear right wheel 1RR. As is clear from FIG. 12, while there is a large degree of dispersion among the wheel positions (number of gear teeth) obtained from the wheel speed sensors 8FR, 8RL, 8RR on the other wheels (front right wheel 1FR, rear left wheel 1RL, rear right wheel 1RR), the degree of dispersion for the wheel position obtained from the wheel speed sensor 8FL for the wheel being evaluated (front left wheel 1FL) is the smallest, and the output frequency of the TPMS sensor 2FL is substantially the same as the output frequency of the wheel speed sensor 8FL.

In some of the existing tire air pressure monitor devices an inclination sensor was also provided in the TPMS sensors, and the wheel position of the TPMS sensors was determined using the relationship between the wheel position of the TPMS sensors and the inclination angle. In this kind of conventional tire air pressure monitor device, the correspondence relationship between the wheel position of the TPMS sensors and the inclination angle would vary because of the differences in the rotation speed of the four wheels that came about depending on travel, and therefore the wheel position of the TPMS sensors could not be accurately determined.

Furthermore, in some of the other existing tire air pressure monitor devices the same number of receivers and TPMS sensors were provided, with the receivers placed in proximity; the wheel position of the TPMS sensors is determined based on the strength of the wireless signal that was received. In this kind of conventional tire air pressure monitor device, it is necessary to consider the output from the sensors, the variance between the sensitivity of the receivers, and the effectiveness of the harness antenna when designing the layout of the receivers; thus, the performance of the device will depend on the receiving environment and the layout. Moreover, given that four receivers are needed, the cost of the system increases.

In response to this the tire air pressure monitor device according to the first embodiment is capable of identifying the wheel position of the TPMS sensors 2 without using the strength of the radio waves, and thus is capable of determining the wheel position of the TPMS sensors 2 without being dependent on the receiving environment or the layout. Moreover, only one receiver 3 is needed, and it is possible to keep costs low.

In the first embodiment the TPMS sensor 2 computes that the rotation position of the TPMS sensor 2 itself is at the highest point from the gravitational acceleration component of the centrifugal acceleration detected by the G sensor 2*b*. In known tire air pressure monitor devices, the G sensor 2*b* is used for determining whether the vehicle is stopped or traveling; therefore by adopting a known TPMS sensor it is possible to eliminate the costs associated with adding a new sensor to the TPMS sensor 2.

Furthermore, in the first embodiment the TPMSCU 4 computes the rotation position of the wheels 1 from the wheel speed pulse of the wheel speed sensor 8. Finally, most vehicles are usually equipped with an ABS unit. Given that the wheel speed sensor 8 is a required component of the ABS unit, it is possible to eliminate the costs associated with adding a new sensor to the vehicle.

[Determining the Dispersion Using the Dispersion Characteristic Value]

The rotation position for the wheel is cyclic angle data; therefore, the degree of dispersion cannot be obtained from the general dispersion formula where the degree of dispersion is defined by the average of "the square of the standard deviation".

Here, in the first embodiment, the dispersion calculation unit 11*b* converts the rotation position θ of the wheels 1 obtained from the wheel speed sensors 8 into coordinates (cos θ, sin θ) on the circumference of a unit circle where the center is at the origin (0, 0), and taking the coordinate (cos θ, sin θ) as a vector, computes the average vector (ave_cos θ, ave_sin θ) for the vectors having the same rotation position data. The dispersion calculation unit 11*b* computes the scalar quantity of the average vector as the dispersion characteristic value X, and thereby avoids the cyclic nature of the rotation position to compute the degree of dispersion of the rotation position.

Figure 13:
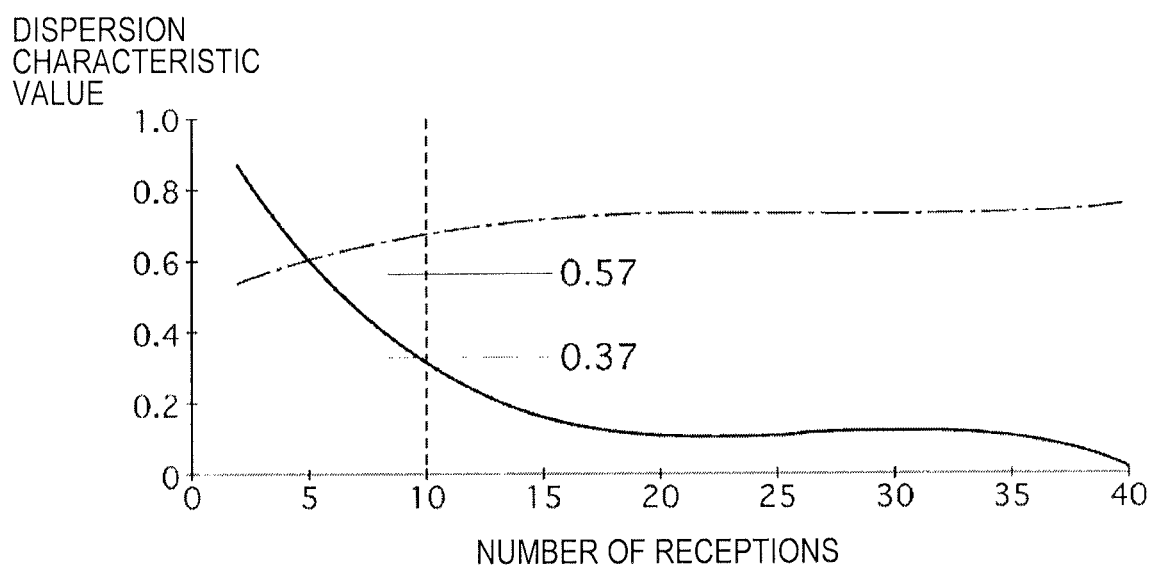
FIG. 13 illustrates the variation in the dispersion characteristic value in accordance with the number of times the TPMS data is received.

FIG. 13 illustrates the variation in the dispersion characteristic value in accordance with the number of times the TPMS data is received. In FIG. 13, "the wheel being evaluated" represents the dispersion characteristic value X calculated from the TPMS sensor 2 that transmitted the TPMS data and the rotation position data from the wheel speed sensor 8 of the same wheel. The "other wheel" represents the dispersion characteristic value X calculated from the TPMS sensor 2 that transmitted the TPMS data and the rotation position data from the wheel speed sensor 8 of a different wheel 1.

As illustrated in FIG. 13, the dispersion characteristic value X for the wheel being evaluated approaches one as the number of receptions increases for the TPMS data for the same sensor ID, and the dispersion characteristic value X for the other wheel approach zero. The difference between the dispersion characteristic value of the wheel being evaluated and the dispersion characteristic value of the other wheel increases as much as the number of receptions increases.

Accordingly, it is possible to accurately determine the degree of dispersion of the rotation position data for the wheels by evaluating the dispersion characteristic value X.

Intermittent Transmission of the TPMS Data

The TPMS sensors 2 wait for 16 seconds or more to pass since the previous transmission of TPMS data, and transmit TPMS data when their own rotation position is at the highest point. In the present embodiment, the dispersion characteristic values X of each of the rotation position data are compared and the wheel position determined; therefore for a given TPMS sensor that transmitted TPMS data, to create a difference between the wheel being evaluated (the same wheel) and the other wheel (a different wheel) it is necessary to secure a certain amount of accumulated travel distance.

Here, provisionally if the TPMS data is transmitted whenever the rotation position in the TPMS data is at the highest point, it tends to be difficult to determine the wheel position because there would be no difference in the dispersion characteristic value X for the wheel being evaluated and the other wheel created over the ten receptions.

Accordingly, setting the transmission interval for the TPMS data to 16+a seconds thereby ensures that a certain accumulated travel distance is obtained until the TPMS data is received 10 or more times, and therefore a sufficient difference is obtained between the dispersion characteristic value X of the wheel being evaluated and the other wheel, and thus it is possible to accurately determine the wheel position.

First Wheel Position Determination Control

In the first embodiment the two wheel position determination controls, that is, the first wheel position determination control and the second wheel position determination control are executed in parallel by the first control unit 11 and the second control unit 12 respectively as the wheel position determination control for determining the mapping between the sensor IDs and the wheels after a tire rotation. The determination results from the first wheel position determination control takes precedence for the sensor ID for which the wheel position is determined by the first wheel position determination control; during the first wheel position determination control, the determination results from the second wheel position determination control are adopted for the sensor ID for which the wheel position could not be determined with a predetermined accumulated travel time.

During the first wheel position determination control, when the highest value is larger than the first threshold of 0.57 for the dispersion characteristic values X when the TPMS data for the same sensor ID is received no less that 10 times, and any of the three remaining dispersion characteristic values X are within the second threshold of 0.37, the wheel position of the rotation position data corresponding to the highest-value dispersion characteristic value X is determined as the wheel position for the sensor ID.

In other words, it is not a mere selection of the dispersion characteristic value X having the highest value, comparison of the highest value with the first threshold (0.57) reveals to what degree the rotation position data having the highest-value dispersion characteristic value of X is synchronized with the TPMS data output frequency and ensures a certain amount of determination accuracy. Moreover, comparison of the dispersion characteristic values which are not the highest value with the second threshold (0.37) thereby allows verification that there is a predetermined difference (0.2) or more between the highest value and the other three values, and thus improves the determination accuracy.

In other words, the wheel position determination in accordance with the first wheel position determination control improves the accuracy in determining the degree of dispersion for the rotation position data for the wheels in contrast to the second wheel position determination control which selects the highest value for the dispersion characteristic value X. Additionally, the first wheel position determination control determines the degree of dispersion of the rotation position data after gathering at least ten data items for the rotation position of the wheels 1; therefore, the accuracy of the first wheel position determination control for determining the degree of dispersion for the rotation position data for the wheels is improved over the second wheel position determination control which may possible gather less than ten data items of rotation position data.

Furthermore, the TPMS sensor 2 transmits TPMS data at approximately 16-second intervals. Thus, when the vehicle continues to travel, after approximately two and a half minutes after the start of the auto-learning mode, at least 10 data items of the rotation position data have been received; since it is possible for the determination of the degree of dispersion to start at this point, in contrast with the second wheel position determination control which waits for the predetermined accumulated travel time (eight minutes) before starting to determine the degree of the dispersion, the first wheel position determination control is able to more quickly determine the mapping between the sensor IDs and the wheel positions.

Second Wheel Position Determination Control

In the first embodiment the rotation position of the wheel 1 is detected from the count value for the wheel speed pulse. Here the wheel speed sensor 8 is a pulse count type sensor; when the corrugated surface of the rotor that rotates with the wheel 1 cuts through the magnetic field formed around the wheel speed sensor 8, the wheel speed sensor outputs the current variation produced in the coil due to the change in the magnetic flux as the wheel speed pulse. Consequently, when the wheel 1 vibrates along with the vibration of the vehicle caused by a shift change while the vehicle is stopped, or caused by the vehicle vibration (that is, by the vehicle continuously rocking between minute angles) due to the steering or to a passenger getting in or out of the vehicle, the count for the wheel speed pulse may increase due to the vibration despite the wheel not actually rotating.

In this case, a deviation arises between the rotation position for the wheel calculated using the number of counts for the wheel speed pulse from a reference number of teeth, and the actual rotation position; the accuracy decreases for determining the degree of dispersion in the rotation position data due to the erroneous detection of the rotation position, and thus the mapping between the sensor IDs and the wheel position cannot be accurately determined. Furthermore, even when the vehicle reverses (is dislodged) because of a hill start or riding up on a curb, the above mentioned problems will occur because the count for the wheel speed pulse may increase although the wheel 1 is actually rotating in the reverse.

In the first wheel position determination control, the vehicle speed pulse calculated while the vehicle is stopped also includes the number of counts and the rotation position (number of gear teeth) of the wheel 1; therefore if there is some deviation in the above-mentioned rotation position when the vehicle is stopped and so forth during the auto-learning mode, the differences among the dispersion characteristic values X tend to not appear due to the erroneous detection of the rotation position, and it becomes difficult to determine the wheel position.

Here, the TPMS sensor 2 is limited to transmitting TPMS data 40 times during the constant position transmission mode to increase the operating life of the button cell 2e, and therefore, the first wheel position determination control cannot continue until the wheel position is determined for all the sensor IDs.

Accordingly, in the first embodiment if during the first wheel position determination control there are sensor IDs for which the wheel position cannot be determined even after the predetermined accumulated travel time (eight minutes) has passed, the wheel for that sensor ID is finalized using the determination results from the second wheel position determination control.

During the second wheel position determination control the highest value for the dispersion characteristic values are selected after the predetermined accumulated travel time has passed, and the wheel position for the sensor ID determined. At this time, it is rare that there would be more than two or highest values, therefore, the wheel position for all of the sensor IDs may be determined.

Furthermore, during the second wheel position determination control one trip is defined as the period during which the wheels are rotating in the same direction. The dispersion characteristic value Xtrp1, Xtrp2, ..., Xtrpm is computed for one trip based on the rotation position data acquired during the one trip; and the final dispersion characteristic value X is calculated based on the dispersion characteristic values Xtrp1, Xtrp2, ..., Xtrpm. Therefore, the influence of the deviation between the number of counts for the wheel speed pulse that are generated when the vehicle is stopped or is in reverse and the actual rotation speed of the wheel 1 may be eliminated and the dispersion values X calculated, to improve the accuracy of determining the degree of dispersion among the rotation positions.

During the second wheel position determination control the dispersion characteristic values Xtrp1, Xtrp2, ..., Xtrpm are weighted by multiplying the dispersion characteristic values Xtrp1, Xtrp2, ..., Xtrpm by a weighted coefficient K1, K2, ..., Km which is the ratio of the number of receptions Nn of TPMS data during one trip to the total number of receptions N of TPMS data during the predetermined accumulated travel time; the final dispersion characteristic value X is the sum $(K1 \times Xtrp1 + K2 \times Xtrp2 + \ldots + Km \times Xtrpm)$ of the post-weighted dispersion characteristic values $K1 \times Xtrp1$, $K2 \times Xtrp2, \ldots, Km \times Xtrpm$.

Figure 14:
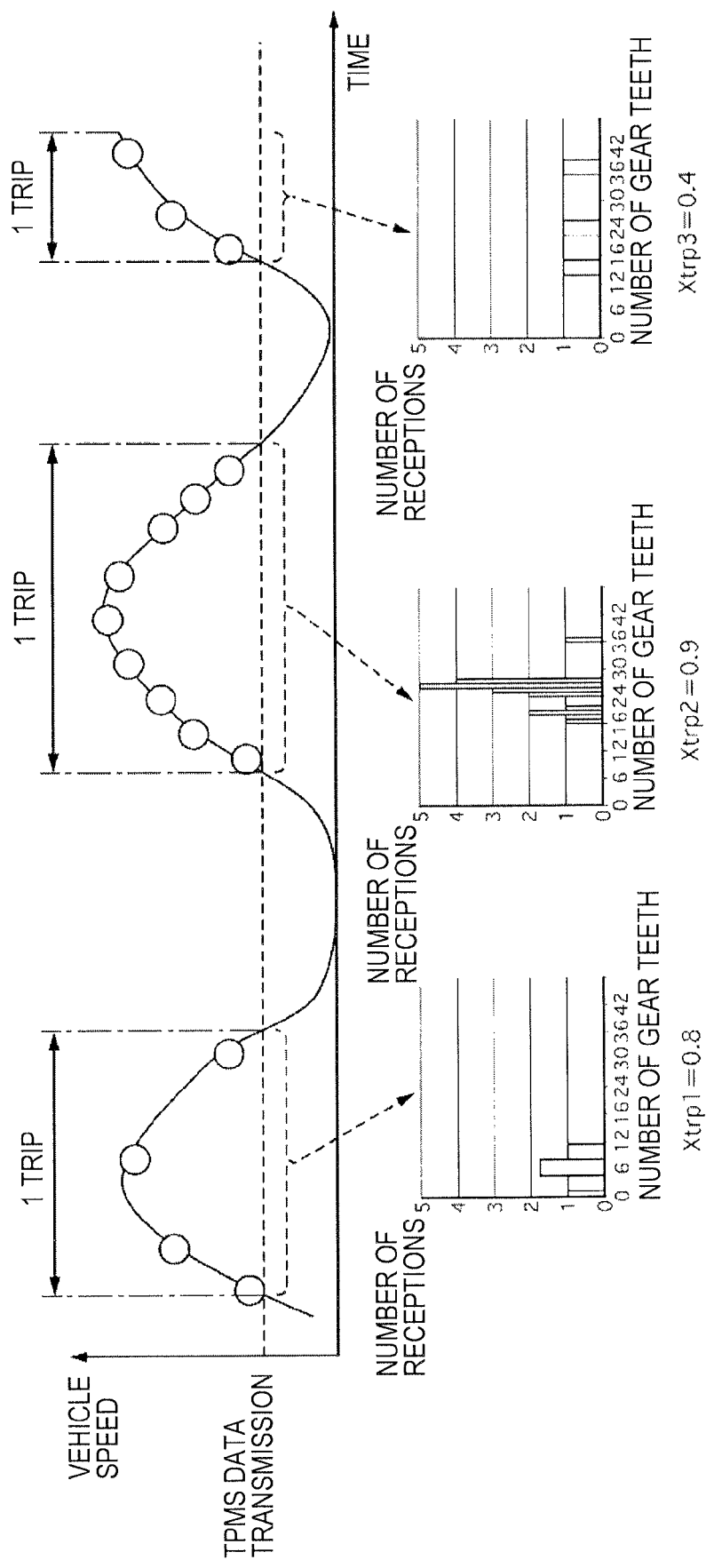
FIG. 14 is an example of how the second wheel position determination control computes the dispersion characteristic value.

FIG. 14 is an example of how the second wheel position determination control computes the dispersion characteristic value. Assume that that in FIG. 14, the predetermined accumulated travel time (eight minutes) has passed during the third trip; the dispersion characteristic value Xtrp1 for the first trip is 0.8; the dispersion characteristic value Xtrp2 for the second trip is 0.9; and the dispersion characteristic value Xtrp3 for the first trip is 0.4.

At this point, the number of receptions Nn of TPMS data during each trip (that is, the number of data items for the rotation position) equals four, nine, and three for the first through third trips respectively. Therefore, the weighted coefficients are K1=4/16, K2=9/16, and K3=3/16 for the first through third trips respectively.

Accordingly, the final dispersion characteristic value X is:

$$X = 4/16 \times 0.8 + 9/16 + 3/16 \times 0.4$$
$$= 0.2 + 0.506 + 0.075$$
$$= 0.781$$

Comparing the dispersion characteristic value Xtrp1, Xtrp3 for the first and the third trip, the value for the number of receptions Nn of the TPMS data is closest to the dispersion characteristic value Xtrp2 for the second trip.

In other words, the more data items for the rotation position are acquired the more the greater the accuracy of the dispersion characteristic value Xtrpm for one trip; therefore, increasing the weight for the dispersion characteristic value Xtrpm having a large number of data items thereby increases the reliability of the final dispersion characteristic value X.

If the number of receptions Nn of TPMS data witing one trip is less than three during the second wheel position determination control without calculating that dispersion characteristic value Xtrpm, the final dispersion characteristic value X is calculated based on the dispersion characteristic value Xtrpm for a trip where the number of receptions Nn of TPMS data within one trip is no less than three. It tends to be difficult for variations to occur in the dispersion characteristic value Xtrpm for the wheels 1 when there are a small number of receptions Nn of the TPMS data within one trip. In other words, if the number of data items is small, an effective dispersion characteristic value Xtrpm may not be obtained for determining the degree of dispersion among the rotation position of the wheels, and therefore eliminating this ineffective value from the final dispersion characteristic value X thereby increases the reliability of the final dispersion characteristic value X.

Figure 15:
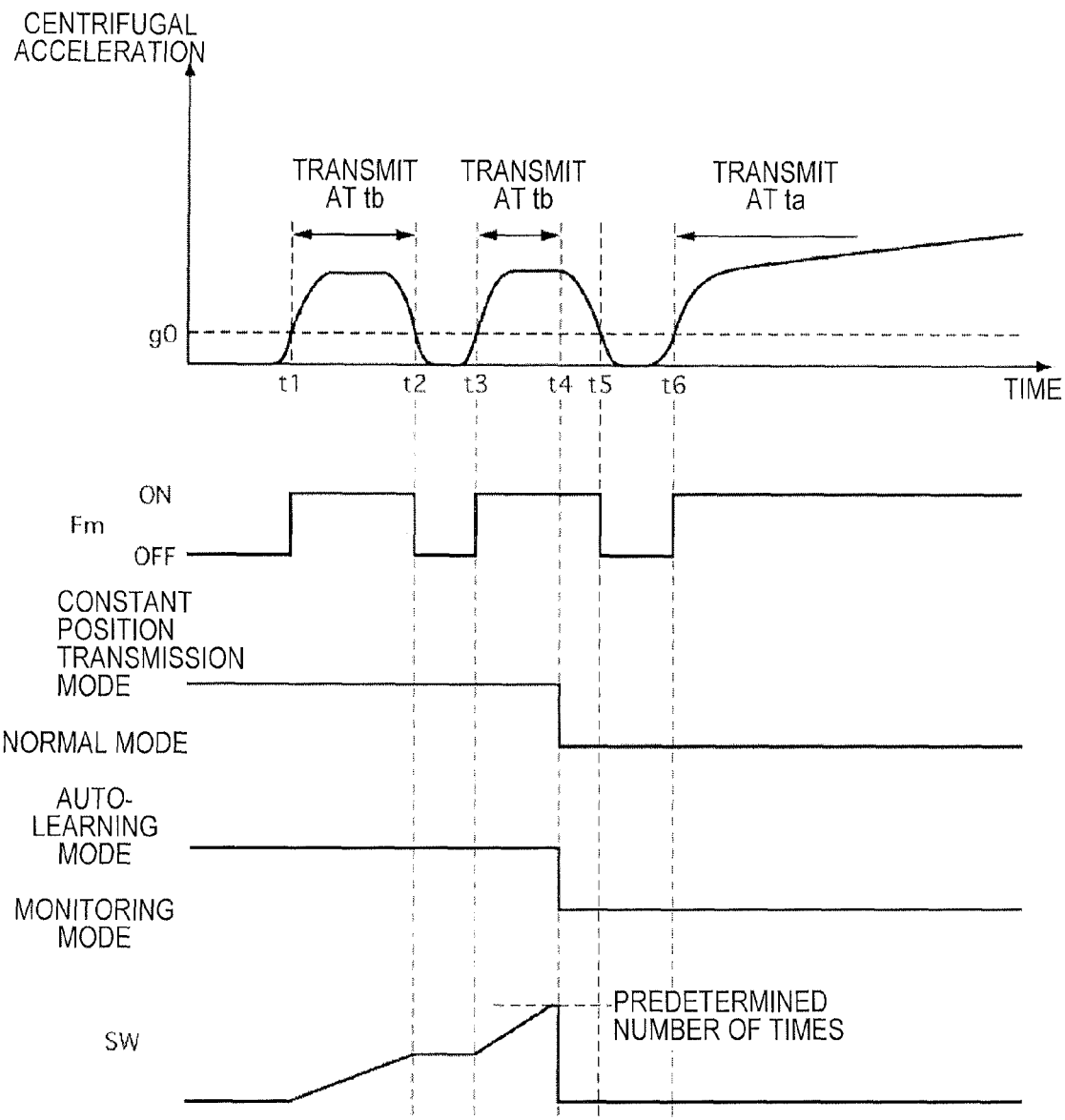
FIG. 15 is a time chart illustrating an operation mode for the TPMS sensor mode and an operation mode for the TPMSCU during travel and stops in the first embodiment.

The operations in the TPMS sensor and the TPMSCU will be described next. FIG. 15 is a time chart illustrating an operation mode for the TPMS sensor mode and an operation mode for the TPMSCU during travel and stops in the first embodiment. In the initial state on the time chart the vehicle has been stopped for no less than a predetermined time, the motion flag Fm is OFF, the TPMS sensor has selected the constant position transmission mode and the TPMSCU has selected the auto-learning mode.

When the vehicle begins to travel, if during the time t1 the centrifugal acceleration exceeds the travel-phase determination threshold g0, the motion flag Fm is set to ON and the TPMS sensor 2 transmits data at intervals tb. At this time the TPMSCU 4 is also in auto-learning mode and identifies the wheel position based on the received data.

During the time t2 when the vehicle decelerates and the centrifugal acceleration falls below the travel-phase determination threshold g0, the motion flag Fm is set to OFF. However, given that the predetermined time or greater has not yet passed, the TPMS sensor 2 remains set to constant position transmission mode and the TPMSCU 4 remains set to auto-learning mode. At this time the number of transmissions or the number of receptions are stored together with the data. Theoretically, even if at this time the ignition switch is turned off, the reception data counted during this reception data counted during this number of transmissions or this number of receptions Sn is written to non-volatile memory and stored.

During the time t3, when the vehicle starts to travel once again and the centrifugal acceleration exceeds the travel-phase determination threshold g0, the motion flag is set to ON, and the TPMS sensor 2 restarts the transmission of data. By this time the transmission data output during the constant position transmission mode up until the previous time may be effectively used, and therefore the data transmitted by the TPMS sensor 2 is also sent out as the previously transmitted next value. Hereby, the data may be effectively used regardless of whether the ignition switch is on or off, and it is possible to control the amount of power consumed by the TPMS sensor 2.

During the time t4, when the number of transmissions Sn reaches a predetermined number, the number of transmissions Sn is reset to zero. The TPMS sensor 2 transitions to normal mode while the TPMSCU 4 transitions to monitoring mode. Hereby the TPMS sensor 2 transmits data at the interval ta.

During the time t5 when the vehicle decelerates and the centrifugal acceleration once again falls below the travel-phase determination threshold g0, the motion flag Fm is set to OFF. However, given that the predetermined time or greater has not yet passed, the TPMS sensor 2 remains set to constant position transmission mode and the TPMSCU 4 remains set to monitoring mode. During the time 16, when the vehicle starts to travel once again and the centrifugal acceleration exceeds the travel-phase determination threshold g0, the motion flag is set to ON, and the TPMS sensor 2 restarts the transmission of data. By this time the predetermined time has not passed since the motion flag Fm was set to OFF, therefore the data transmission takes place in normal mode.

The effects will be described next.

The tire air pressure monitor device of the first embodiment exhibits the following effects.

(1) A tire air pressure monitor device provided for monitoring the air pressure in tires is provided with a pressure sensor 2a installed in the tire of each of the wheels 1 for detecting the air pressure in the tire; a transmitter 2d provided on each of the wheels 1 for transmitting by wireless signals the air pressure information along with a sensor ID when at a predetermined rotation position; a receiver 3 provided on the vehicle body for receiving the wireless signals; a rotation position calculation unit 11a, 12a provided on the vehicle body to correspond to each of the wheels 1 for determining the rotation position of the wheel 1; and a wheel position determination means for acquiring the rotation position of the wheels a plurality of times when a wireless signal containing a certain sensor ID is transmitted, accumulating the same as rotation position data for the wheels 1, and determining the wheel position corresponding to the rotation position data having the smallest degree of dispersion from among each of the rotation position data as the wheel position for the transmitter 2d corresponding to the sensor ID.

Hereby, the wheel position of the TPMS sensors 2 may be accurately determined.

(2) The wheel position determination means is provided with a first control unit 11 that before the accumulated travel time of the vehicle reaches the predetermined accumulated travel time (eight minutes) computes the degree of dispersion of the wheel position data when the number of data items for the rotation position data reaches or exceeds a predetermined number (ten), calculates the degree of dispersion among the wheel position data, and determines the wheel position corresponding to the rotation position data having the smallest degree of dispersion from among the rotation position data as the wheel position for the transmitter 2d corresponding to the sensor ID; and a second control unit 12 that when the accumulated travel time of the vehicle reaches the predetermined accumulated travel time (eight minutes), calculates the degree of dispersion among the wheel position data and determines the wheel position corresponding to the rotation position data having the smallest degree of dispersion from among the rotation position data as the wheel position for the transmitter 2d corresponding to the sensor ID.

Hereby, the first control unit 11 acquires the degree of dispersion among the rotation position data using a predetermined number of rotation position data items when the vehicle continues traveling to an extent, and therefore the first control unit 11 is capable of accurately determining the rotation position of the TPMS sensors 2. On the other hand, the second control unit 12 acquires the degrees of dispersion among the rotation position data when the accumulated travel time for the vehicle reaches the predetermined travel time, and therefore the second control unit 12 is capable of reliably determining the rotation position of the TPMS sensors 2 even in a situation where the vehicle's has not moved due to traffic congestion and the like.

(3) The first control unit 11 and the second control unit 12 convert the rotation position of each of the wheels 1 to a vector with a start point at the origin of a two dimensional plane and the end point at a point $(\cos \theta, \sin \theta)$ on the circumference of a unit circle; compute the scalar quantity of the average vector $(ave\_\cos \theta, ave\_\sin \theta)$ of the vectors for the rotation position data as the dispersion characteristic value X; and compares the dispersion characteristic values X to acquire the degree of dispersion among the rotation position data.

Hereby, it is possible to avoid the cyclic nature of the rotation position data and calculate the degree of dispersion of the rotation position.

(4) The first control unit 11 determines the rotation position data corresponding to the highest value as having the smallest degree of dispersion when the highest value among the dispersion characteristic values X exceeds the first threshold of 0.57.

Hereby, it is possible to secure a certain amount accuracy of the determination.

(5) The first control unit 11 determines the rotation position data corresponding to the highest value as having the smallest degree of dispersion when excluding the dispersion characteristic value having the highest value, all the dispersion characteristic values X are below the second threshold of 0.37 which is smaller than the first threshold of 0.57. Hereby it is possible to improve the accuracy of the determination.

(6) For each period (one trip) when the wheels are traveling in the same direction during a predetermined accumulated travel time, the second control unit 12 calculates the dispersion characteristic value Xtrpm among the rotation position data for an individual period based on the rotation position data acquired during said period, and calculates a total dispersion characteristic value X among the rotation position data based on the dispersion characteristic value Xtrpm for the individual periods, and finally determines the rotation position data corresponding to the highest value total dispersion characteristic value X among the total dispersion characteristic values as having the smallest degree of dispersion.

Hereby, it is possible to suppress the erroneous detection of the rotation position due to wheel vibrations while the vehicle is stopped or when the vehicle is in reverse, and thus it is possible to accurately determine the wheel position of the TPMS sensors 2.

(7) The transmitter 2d is provided with a control step S30 (a mode switching means) for switching the transmitter 2d between a constant position transmission mode where the transmitter 2d transmits an interval tb (a first interval) when a first predetermined condition is true, and at all other times switching to a normal mode where the transmitter 2d transmits at an interval to (a second interval) which is longer than the interval tb. The receiver 3 is provided with a unit (mode detection unit) for detecting the operating mode of the transmitter 2d using a control step S40 in which are made the same assessments as in the control step 30 in the transmitter 2d.

Namely, the transmitter 2d is provided with transmission modes having different intervals to thereby control the amount of power consumed by the transmitter 2d. Furthermore, the receiver is able to always detect the mode of the transmitter 2d even without a communication function; and it is possible to accurately determine the wheel position.

(8) The first predetermined condition is true when a predetermined time or greater has passed while the motion flag Fm is OFF (the state where no signals have been transmitted from the transmitter 2d); or, before the predetermined time or greater has passed and before the number of transmissions Sn transmitted at the interval tb has reached a predetermined number. The receiver 3 is configured to store the number of receptions Sn received during the constant position transmission mode and the data received therewith, and the TPMSCU 4 (wheel position determination means) is configured to determine the wheel position based on the stored data and the newly received data.

When the predetermined time or greater has passed, there is a possibility that a tire rotation was performed, and therefore the transmitter 2d switches to constant position transmission mode. At this time transmissions are sent at the shorter interval tb and which tends to consume power. Therefore, even if when the device is switched to constant position transmission mode the rotation of the wheels momentarily stops partway and the transmission of data stops, as long as the device is operating in constant position transmission mode by transmitting the data following the data previously transmitted in constant position transmission mode it is possible to reduce the number of data transmissions and thus control the amount of power consumed by the transmitter 2d. Additionally, the TPMSCU 4 is configured to determine the wheel position based on both the previously received data and the newly received data, and therefore avoids the risk of a discrepancy in the detection.

(9) The receiver continues to execute the mode selection control process and the auto-learning mode selection process (mode detection unit) until the predetermined time has passed regardless of the state of the ignition switch.

Therefore, even if the vehicle starts to travel and the vehicle stops during operation in auto-learning mode and the ignition switch is turned off, there will be no deviation between the detection of the mode in the transmitter 2d and the detection carried out in the receiver. Accordingly, when the ignition switch is turned on again within the predetermined time and travel starts the data already transmitted by the transmitter 2d and the newly transmitted data are effectively used within the receiver 3 and it is possible to control the amount of power consumed by the transmitter 2d.

Embodiment 2

Figure 16:
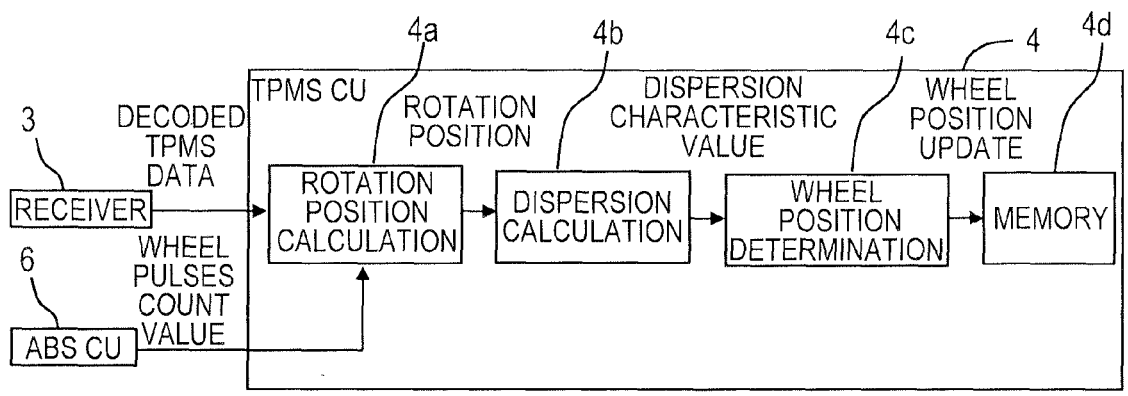
FIG. 16 is a control block diagram of the TPMSCU 4 for carrying out wheel position determination control in the second embodiment.

FIG. 16 is a control block diagram of a TPMSCU 4 which carries out the wheel position determination control of the second embodiment. The TPMSCU 4 (wheel position determination means) is provided with a rotation position calculation unit 4a, a dispersion calculation unit 4b, a wheel position determination unit 4c, and a memory 4d.

The rotation position calculation unit 4a, the dispersion calculation unit 4b, the wheel position determination unit 4c, have the same processes as the rotation position calculation unit 11a, the dispersion calculation unit 11b, the wheel position determination unit 11c of the first embodiment illustrated in FIG. 7. In addition in the second embodiment, the wheel position determination unit 4c stores the mapping between the sensors IDs and the wheel positions via a memory update of the memory 4d.

Wheel Position Determination Control Process

The flow of the wheel position determination control process of the second embodiment is the same as the flow of the first wheel position determination control process of the first embodiment illustrated in FIG. 10, therefore the drawings and descriptions will not be included here.

Therefore, with the exception of the second wheel position determination control operation, the operations described in the first embodiment may be implemented in the second embodiment.

The effects will be described next.

The tire air pressure monitor device of the second embodiment exhibits the following effects in addition to the effects of (1) and (7) through (9) described with the first embodiment.

(10) The TPMSCU 4 converts the rotation position of each of the wheels 1 to a vector with a start point at the origin of a two dimensional plane and the end point at a point (cos θ, sin θ) on the circumference of a unit circle; calculates the scalar quantity of the average vector (ave_cos θ, ave_sin θ) of the vectors for the rotation position data as the dispersion characteristic value X; determines the highest value among the dispersion characteristic values X has having the smallest degree of dispersion.

Hereby, it is possible to avoid the cyclic nature and calculate the degree of dispersion of the rotation position.

(11) When the highest value among the dispersion characteristic values X exceeds the first threshold of 0.57, the TPMSCU 4 determines the rotation position data corresponding to the highest value as having the smallest degree of dispersion.

Hereby, it is possible to secure a certain amount accuracy of the determination.

(12) Excluding the dispersion characteristic value having the highest value, when the dispersion characteristic values X are below the second threshold of 0.37 which is smaller than the first threshold of 0.57, the TPMSCU 4 determines the rotation position data corresponding to the highest value as having the smallest degree of dispersion.

Hereby it is possible to improve the accuracy of the determination.

Embodiment 3

Figure 17:
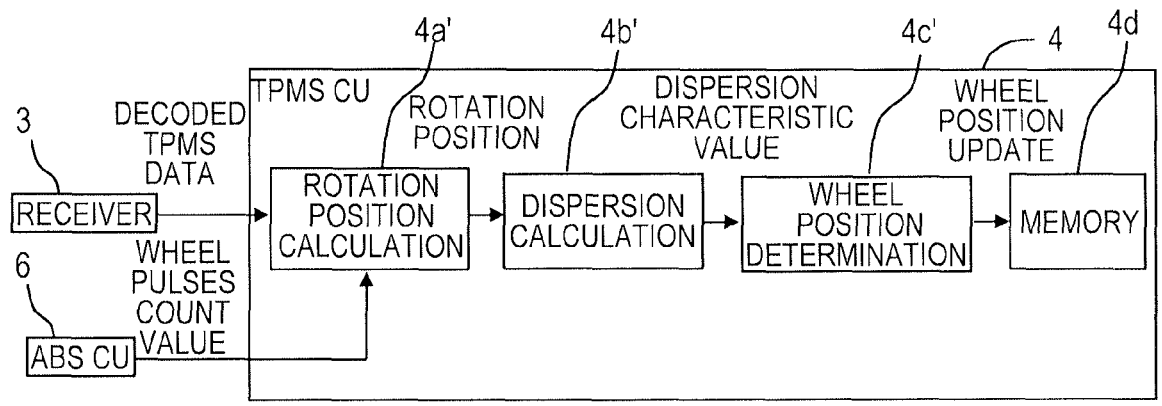
FIG. 17 is a control block diagram of the TPMSCU 4 for carrying out wheel position determination control in the third embodiment.

FIG. 17 is a control block diagram of a TPMSCU 4 which carries out the wheel position determination control of the third embodiment. The TPMSCU 4 (wheel position determination means) is provided with a rotation position calculation unit 4a', a dispersion calculation unit 4b', a wheel position determination unit 4c', and a memory 4d.

The rotation position calculation unit 4a', the dispersion calculation unit 4b', the wheel position determination unit 4c', have the same processes as the rotation position calculation unit 12a, the dispersion calculation unit 12b, the wheel position determination unit 12c of the first embodiment illustrated in FIG. 7. In addition, in the third embodiment, the wheel position determination unit $4c'$ stores the mapping between the sensors IDs and the wheel positions via a memory update of the memory $4d$.

Wheel Position Determination Control Process

The flow of the wheel position determination control process of the third embodiment is the same as the flow of the second wheel position determination control process of the first embodiment illustrated in FIG. 11, therefore the drawings and descriptions will not be included here.

Therefore, with the exception of the first wheel position determination control operation, the operations described in the first embodiment may be implemented in the third embodiment.

The effects will be described next.

The tire air pressure monitor device of the third embodiment exhibits the following effects in addition to the effects of (1) and (7) through (9) described with the first embodiment.

(13) The TPMSCU 4 accumulates as the rotation position data for the wheels 1 the rotation position of the wheels 1 acquired a plurality of times when a wireless signal is transmitted including a certain sensor ID during a period when the wheels 1 are rotating in the same direction; and determines the wheel position corresponding to the rotation position data having the smallest degree of dispersion from among the rotation position data as the wheel position for the transmitter $2d$ corresponding to the sensor ID.

Hereby, it is possible to suppress the erroneous detection of the rotation position due to wheel vibrations while the vehicle is stopped or when the vehicle is in reverse, and thus it is possible to accurately determine the wheel position of the TPMS sensors 2.

(14) The TPMSCU 4 calculates the degree of dispersion (Xtrp1, Xtrp2, ..., Xtrpm) among the rotation position data during a plurality of periods when the wheels 1 are rotating in the same direction up until the accumulated travel time for the vehicle reaches a predetermined time (eight minutes); and calculates a final degree of dispersion (final dispersion characteristic value X) based on the degree of dispersion for each of the periods. This hereby facilitates determining the degree of dispersion for the rotation position for the wheels 1.

(15) The TPMSCU 4 weights the degree of dispersion for each of the periods by assigning a larger weight to the rotation position with the larger the number of data items, and computes the final degree of dispersion based on the weighted degree of dispersion for each of the periods.

This hereby increases the reliability of the final degree of dispersion.

(16) From among the plurality of periods, the TPMSCU 4 calculates the final degree of dispersion based on the degree of dispersion for periods having a predetermined number (three times) or more of data items for the rotation position.

This hereby increases the reliability of the final degree of dispersion.

Embodiment 4

Figure 18:
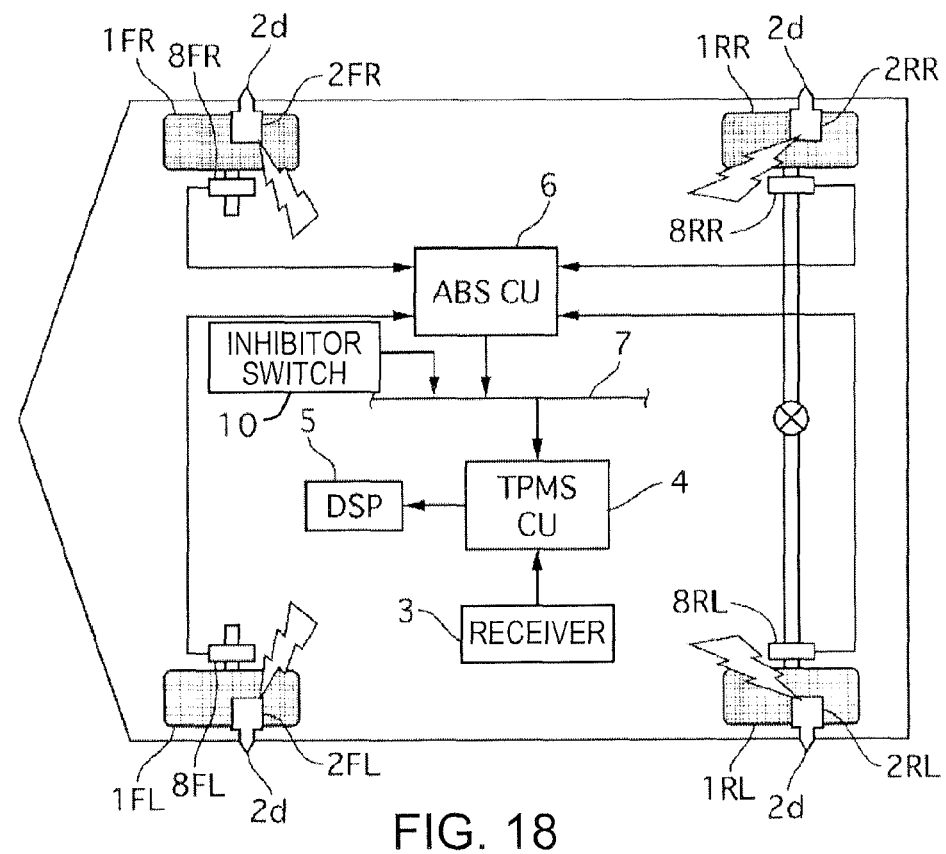
FIG. 18 is a configuration diagram of a tire air pressure monitor device in the fourth embodiment.

FIG. 18 is a configuration diagram of a tire air pressure monitor device in the fourth embodiment. The fourth embodiment is provided with an inhibitor switch 10 (inhibitor SW) in addition to the configuration illustrated in FIG. 1 for the first embodiment.

Wheel Position Determination Control

Figure 19:
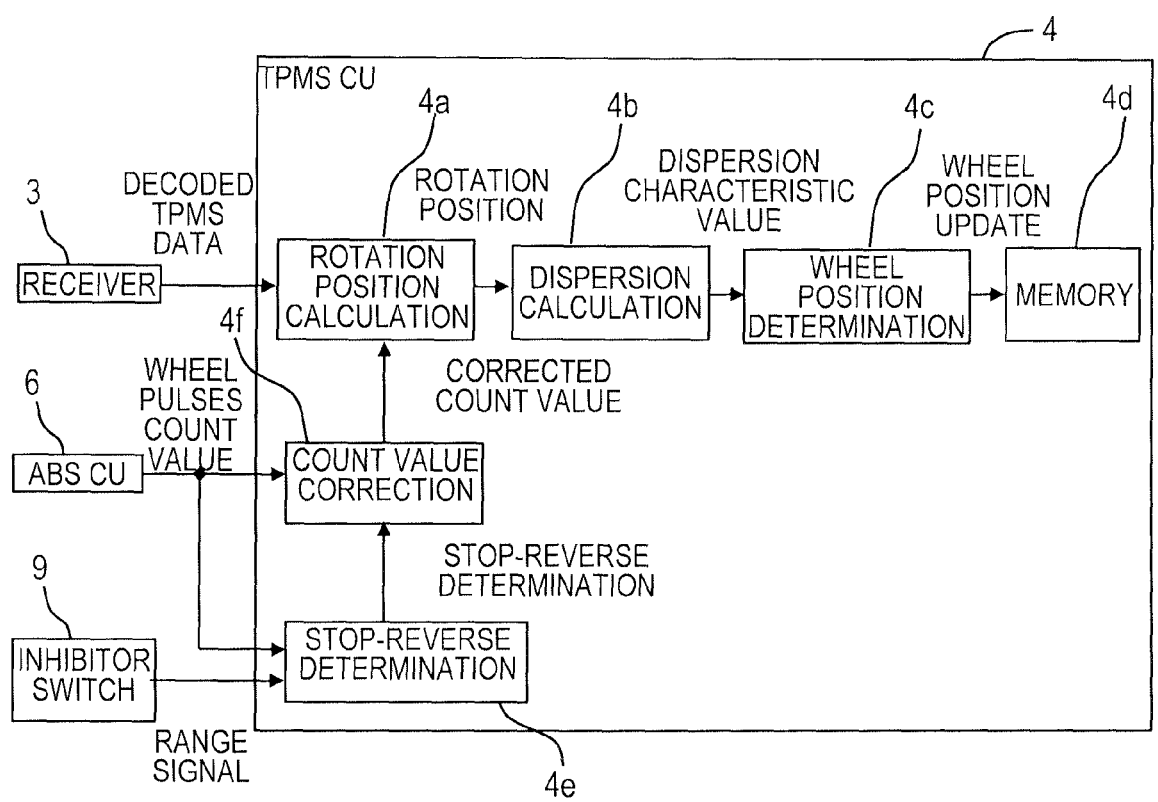
FIG. 19 is a control block diagram of the TPMSCU 4 for carrying out wheel position determination control in the fourth embodiment.

FIG. 19 is a control block diagram of a TPMSCU 4 which carries out the wheel position determination control of the fourth embodiment. Along with the configuration of the first embodiment illustrated in FIG. 7, the TPMSCU 4 (wheel position determination means) is provided with a stop-reverse determination unit $4e$ (specific vehicle-status detection means), and a count value correction unit $4f$ (count value correction means).

When the transmission range signal from the inhibitor switch 10 is for the park (P) transmission range or when all the count values for the wheel speed pulse have not been counted (the count increased) for a predetermined time (400 msec, for example) or more, the stop-reverse determination unit $4e$ determines that the vehicle is stopped and outputs a vehicle-stop determination signal to the count value correction unit $4f$. Additionally, when the transmission range signal from the inhibitor switch is for the reverse (R) transmission range, the stop-reverse determination unit $4e$ determines that the vehicle is in reverse and outputs a vehicle-reverse signal to the count value correction unit $4f$.

If the stop-reverse determination unit $4e$ determines that the vehicle has stopped, the count value correction unit $4f$ outputs a corrected count value to the rotation position calculation unit $4a$, where the corrected count value is the result of subtracting the number of counts while the vehicle is stopped from the count values of the vehicle wheel pulses output from the ABS control unit 6 (count value computation means). If the stop-reverse determination unit $4e$ determines that the vehicle is in reverse, the count value correction unit $4f$ outputs a corrected count value to the rotation position calculation unit $4a$, where the corrected count value is the result of subtracting a number that is twice the number of counts while the vehicle is in reverse from the count values of the vehicle wheel pulses output from the ABS control unit 6. Finally, if neither a vehicle stop nor a vehicle reverse was determined, then the count value output from the ABS control unit 6 is output, without change, to the rotation position calculation unit $4a$.

Wheel Position Determination Control Process

Figure 20:
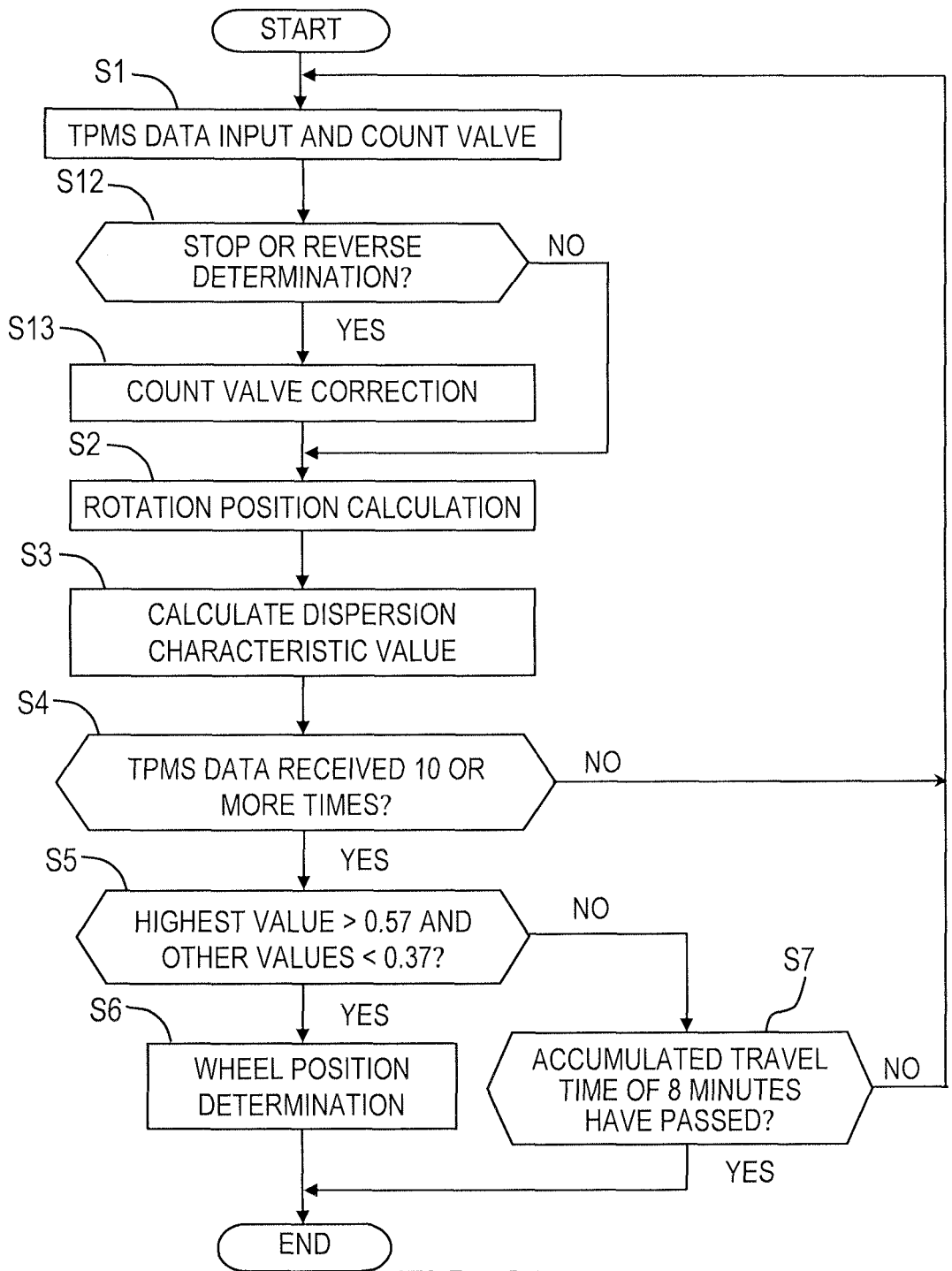
FIG. 20 is a flow chart illustrating the flow of the second wheel position determination control process in the fourth embodiment.

FIG. 20 is a flow chart illustrating the flow of the wheel position determination control process in the fourth embodiment. Each step in this flow is described below. However, while the steps having the same processing as the first wheel position determination control process of the first embodiment illustrated in FIG. 10 are given the same step numbers, the same descriptions will be not be repeated here.

In step S11, the rotation position calculation unit $4a$ receives the TPMS data from the sensor having the sensor ID=1, while the count value for the wheel speed pulses are input into the stop-reverse determination unit $4e$.

In step S12, the stop-reverse determination unit $4e$ determines if the vehicle is stopped or in reverse while the count value correction unit determines whether or not the stop-reverse determination unit $4e$ has determined the vehicle stop or the vehicle reverse; if YES, the control proceeds to step S13, and if NO, the control proceeds to step S2.

In step S13 the count value correction unit corrects the count value. If the stop-reverse determination unit $4e$ determined a vehicle stop, the count value correction unit subtracts the number of counts during the vehicle stop period from the count value output from the ABS control unit 6, On the other hand if the stop-reverse determination unit $4e$ determined a vehicle reverse, the count value correction unit subtracts two times the number of counts during the vehicle reverse period from the count value output from the ABS control unit 6.

The operations will be described next.

As described in the first embodiment, during auto-learning mode when the vehicle stops, the wheel 1 will vibrate along with the vibration of the vehicle caused by a shift change while the vehicle is stopped, or caused by the steering or with a passenger getting in or out of the vehicle, and thus the count for the wheel speed pulse may increase due to the vibration despite the wheel not actually rotating. Furthermore, if the vehicle reverses during auto-learning mode, the count for the wheel speed pulse will increase although the wheels are rotating in reverse.

The TPMSCU 4 uses the fact that there is a constant relationship between the rotation position of the same wheel and the count value for the wheel speed pulse to calculate the degree of dispersion for the rotation position. Given that the wheel position is being determined, if there is a deviation in the relationship between rotation position and the count value for the wheel speed pulse from the relationship (predetermined relationship) when the TPMSCU 4 sets the reference number of gear teeth, this reduces the accuracy when calculating the degree of dispersion in the rotation position data, thus the TPMSCU 4 is unable to accurately determine the mapping between the sensor IDs and the wheel position which may potentially cause a delay in the wheel position determination process.

In view of this, the TPMSCU in the fourth embodiment, determines whether the vehicle has stopped and if it is determined that the vehicle has stopped, outputs the corrected count value to the rotation position calculation unit 4a, where the corrected count value is the result of subtracting the number of counts while the vehicle is stopped from the count values of the vehicle wheel pulses output from the ABS control unit 6. The wheels 1 stop rotating while the vehicle is stopped, therefore the wheel speed pulses counted during that period may be considered to be causes by vibrations of the wheel 1. Therefore, subtracting the count number caused by the vibration of the wheel 1 from the count value thereby restores the relationship between the rotation position of the same wheel and the count value for the wheel speed pulse to the relationship when the reference number of gear teeth were set, so that the rotation position of the wheel 1 may be detected. Accordingly, given that the erroneous detection of the wheel position may be suppressed and a dispersion characteristic value X may be calculated which actually coincides with the actual rotation position of the wheel 1, the mapping between the sensor IDs and the wheel positions may be accurately determined to thereby suppress the possibility of delaying the wheel position determination.

In addition, the TPMSCU in the fourth embodiment determines whether the vehicle is in reverse, and if the vehicle is in reverse, outputs the corrected count value to the rotation position calculation unit 4a, where the corrected count value is the result of subtracting a number that is twice the number of counts while the vehicle is in reverse from the count values of the vehicle wheel pulses output from the ABS control unit 6. The wheels 1 rotate backward while the vehicle is in reverse, therefore the wheel speed pulses counted during that period may be considered to be causes by reversing of the wheel 1. Therefore, subtracting the count number caused by the reverse of the wheel 1 from the count value thereby restores the relationship between the rotation position of the same wheel and the count value for the wheel speed pulse to the relationship when the reference number of gear teeth were set, so that the rotation position of the wheel 1 may be detected. Accordingly, given that the erroneous detection of the wheel position may be suppressed and a dispersion characteristic value X may be calculated which actually coincides with the actual rotation position of the wheel 1, the mapping between the sensor IDs and the wheel positions may be accurately determined to thereby suppress the possibility of delaying the wheel position determination.

Vehicle Stop or Vehicle Reverse Determination

In the fourth embodiment, the vehicle is determined to be stopped when the park transmission range is selected, or when all the count values for the wheel speed pulse have not been counted for a predetermined time (400 msec) or greater.

Generally, when the vehicle speed is calculated using the wheel speed sensor, the vehicle speed is taken as 0 km/h for an extremely low vehicle speed range (for example, less than 3 km/h); therefore, it is not possible to dependably determine whether the vehicle is stopped from the wheel speed pulse. In view of this, when the park transmission range is selected the automatic transmission is locked internally and the drive wheels cannot move, therefore there is a high probability that the vehicle is stopped. Therefore, determining whether the vehicle is stopped based on whether or not the park transmission range has been selected thereby increases the accuracy of determining whether the vehicle is stopped.

If all of the count values for the wheel speed pulses have not been counted for the predetermined time (400 msec) or greater, there is a greater possibility that the wheel has stopped rotating. Therefore, determining whether the vehicle is stopped based on interval of the wheel speed pulses increases the accuracy of determining whether the vehicle is stopped. The reason for using all the count values for the wheel speed pulses is that when the vehicle starts travel on a slippery road and the drive wheel slips, given that the drive wheel rotates and a driven wheel does not, the situation may be mistakenly assessed as a vehicle stop. In addition, in the fourth embodiment, the vehicle is determined to be in reverse when the reverse transmission range is selected. Given that the vehicle would hardly move forward while the reverse transmission range is selected, determining that the vehicle in reverse based on whether or not the reverse transmission range is selected thereby increases the accuracy of determining whether the vehicle is in reverse.

The effects will be described next.

The tire air pressure monitor device of the fourth embodiment exhibits the following effects in addition to the effects (1) and (7) through (9) described with the first embodiment, and the effects (10) through (12) described with the second embodiment.

(17) Provided are the stop-reverse determination unit 4e for detecting a specific vehicle state (vehicle stop, vehicle reverse) wherein the relationship between the rotation position for the same wheel and the count value deviates from a predetermined relationship, and a count value correction unit for correcting the count value so that when the specific vehicle status is detected, the relationship between the rotation position for the wheels and the count value approaches the predetermined relationship.

Hereby, it is possible to correct for the deviation between the rotation position of the same wheel and the count value for the wheel speed pulse, and thus accurately determine the wheel position of the TPMS sensor 2.

(18) The stop-reverse determination unit 4e determines whether the vehicle is stopped, and the count value correction unit 4f subtracts the number of counts during the period the vehicle is determined to be stopped from the count value output from the ABS control unit 6.

Accordingly, the wheel position may be erroneously detected due to vibration of the wheel 1 while the vehicle is stopped; however, this erroneous detection of the wheel position may be suppressed and a dispersion characteristic value X may be calculated which actually coincides with the actual rotation position of the wheel 1; therefore the mapping between the sensor IDs and the wheel positions may be accurately determined to thereby suppress the possibility of delaying the wheel position determination.

(19) The stop-reverse determination unit 4e determines that the vehicle is stopped when the park transmission range is selected; therefore the vehicle stop may be more accurately determined.

(20) The stop-reverse determination unit 4e determines that the vehicle is stopped when no wheel speed pulse is output from all the wheel speed sensor 8 for a predetermined time or greater; therefore the vehicle stop may be more accurately determined.

(21) The stop-reverse determination unit 4e determines whether the vehicle is in reverse, and the count value correction unit 4f subtracts a number that is double the number of counts during the period the vehicle is determined to be in reverse from the count value output from the ABS control unit 6.

Accordingly, the wheel position may be erroneously detected due to vehicle being in reverse; however, this erroneous detection of the wheel position may be suppressed and a dispersion characteristic value X may be calculated which actually coincides with the actual rotation position of the wheel 1; therefore the mapping between the sensor IDs and the wheel positions may be accurately determined to thereby suppress the possibility of delaying the wheel position determination.

(22) The stop-reverse determination unit 4e determines that the vehicle is in reverse when the reverse transmission range is selected; therefore the vehicle reverse may be more accurately determined.

Other Embodiments

The best modes of the invention have been described based on the drawings and in accordance with the above-mentioned embodiments; however, the particular configuration of the present invention is not limited to these embodiments; modifications in design and so forth are also included in the scope of the present invention so long as the modifications do not deviate from the spirit and scope of the present invention.

For instance, the embodiments illustrate the example where the auto-learning mode continues until the number of receptions Sn reaches a predetermined number of times, however, the TPMSCU may change to the monitoring mode before reaching the predetermined number of times if all of the wheel positions have been specified in the auto-learning mode. In this case, the transmitter may operates in the constant position transmission mode until the number of transmissions reaches the predetermined number of times, and the receiver, in addition to identifying the operating mode, may use the information received.

The invention claimed is:

1. A tire air pressure monitor device that monitors air pressure in tires, the tire air pressure monitor device comprising:
a tire air pressure sensor configured to be installed on wheels of the tires to detect the air pressure in the tires;
a transmitter configured to be provided on each of the wheels to transmit via wireless signal the air pressure along with identification information inherent to the transmitter;
a receiver configured to be provided on a vehicle body to receive the wireless signal;
a rotation position calculation unit provided on the vehicle body to correspond to each of the wheels for detecting a rotation position of the wheel; and
a wheel position determination unit that accumulates as rotation position data for the wheels, the rotation position of the wheels acquired a plurality of times when a wireless signal is transmitted including a certain identification information; and that determines wheel position corresponding to the rotation position data having a smallest degree of dispersion from among the rotation position data as the wheel position for the transmitter corresponding to the identification information,
the wheel position determination unit converting the rotation position of each of the wheels to a vector with a start point at an origin of a two dimensional plane and an end point at a point on a circumference of a unit circle; calculates a scalar quantity of an average vector of vectors for the rotation position data as a dispersion characteristic value; and determines a highest value among the dispersion characteristic values has having the smallest degree of dispersion.

2. The tire air pressure monitor device according to claim 1, wherein
the wheel position determination unit determines the rotation position data corresponding to the highest value as having the smallest degree of dispersion when the highest value among the dispersion characteristic values exceeds a first threshold.

3. The tire air pressure monitor device according to claim 2, wherein
the wheel position determination means determines the rotation position data corresponding to the highest value as having the smallest degree of dispersion if, when excluding the dispersion characteristic value having the highest value, all the dispersion characteristic values are below the second threshold which is smaller than the first threshold.

4. The tire air pressure monitor device according to claim 1, further comprising:
a wheel speed sensor for outputting a wheel speed pulse that is a proportion of a rotation speed of the wheel;
a count value computation unit for computing a count value for the wheel speed pulses;
the rotation position calculation unit detects the rotation position of the wheels from the count value of the wheel speed pulses; a specific vehicle-status detection unit for detecting a specific vehicle state where a relationship between the rotation position of the same wheel and the count value deviates from a predetermined relationship; and
a count value correction unit that corrects the count value so that the relationship between the rotation position of the wheels and the count value approaches the predetermined relationship when the specific vehicle state is detected.

5. The tire air pressure monitor device according to claim 4, wherein
the specific vehicle-status detection unit determines that the vehicle is stopped; and
the count value correction unit subtracts a number of counts during a period when the vehicle is determined to be stopped from the count value computed by the count value computation unit.

6. The tire air pressure monitor device according to claim 5, wherein
the specific vehicle-status detection unit determines that the vehicle is stopped when a park transmission range is selected.

7. The tire air pressure monitor device according to claim 5, wherein
the specific vehicle-status detection unit determines that the vehicle is stopped when no wheel speed pulses are output from all the wheel speed sensors for a second predetermined time or greater.

8. The tire air pressure monitor device according to claim 4, further comprising:
the specific vehicle-status detection unit determines that the vehicle is in reverse; and the count value correction unit subtracts a number that is double a number of counts during a period when the vehicle is determined to be in reverse from the count value computed by the count value computation unit.

9. The tire air pressure monitor device according to claim 8 wherein
the specific vehicle-status detection unit determines that the vehicle is in reverse when a reverse transmission range is selected.

10. The tire air pressure monitor device according to claim 1, wherein
the transmitter has a mode switching means that switches to a constant position transmission mode in which the transmitter transmits at a first interval when a first predetermined condition is met; and at all other times switches to a normal mode in which the transmitter transmits at a second interval that is longer than the first interval,
the receiver includes a mode detection unit for detecting an operating mode of the transmitter using same assessments as in a mode assessing unit in the transmitter,
the first predetermined condition is met when a third predetermined time or greater has passed and no signal has been transmitted from the transmitter, or before the third predetermined time or greater has passed and before a number of transmissions transmitted at the first interval has reached a predetermined number;
the receiver stores a number of receptions received during the constant position transmission mode, and data received therewith; and
the wheel position determination unit determines the wheel position based on stored data, and newly received data.

11. The tire air pressure monitor device according to claim 10, wherein
the receiver continues operation of the mode detection unit regardless of state of an ignition switch until the third predetermined time has passed.

12. A tire air pressure monitor device that monitors air pressure in tires, the tire air pressure monitor device comprising:
a tire air pressure sensor configured to be installed on wheels of the tires to detect the air pressure in the tires;
a transmitter configured to be provided on each of the wheels to transmit via wireless signal the air pressure along with identification information inherent to the transmitter;
a receiver configured to be provided on a vehicle body to receive the wireless signal;
a rotation position calculation unit provided on the vehicle body to correspond to each of the wheels for detecting a rotation position of the wheel;
a wheel position determination unit that accumulates as rotation position data for the wheels, the rotation position of the wheels acquired a plurality of times when a wireless signal is transmitted including a certain identification information; and that determines wheel position corresponding to the rotation position data having a smallest degree of dispersion from among the rotation position data as the wheel position for the transmitter corresponding to the identification information; and
a wheel speed sensor that outputs a wheel speed pulse that is a proportion of a rotation speed of the wheel,
the rotation position calculation unit detecting the rotation position of the wheel from a count value for the wheel speed pulse,
the wheel position determination unit accumulating as the rotation position data for the wheels the rotation position of the wheels acquired the plurality of times when the wireless signal is transmitted including a certain sensor ID during a period when the wheels are rotating in an identical direction; and determines the wheel position corresponding to the rotation position data having the smallest degree of dispersion from among the rotation position data as the wheel position for the transmitter corresponding to the sensor ID,
the wheel position determination unit calculating a degree of dispersion among the rotation position data during a plurality of periods when the wheels are rotating in the identical direction up until an accumulated travel time for the vehicle reaches a first predetermined time; and calculating a final degree of dispersion based on the degree of dispersion for each of the periods.

13. The tire air pressure monitor device according to claim 12, wherein
the wheel position determination unit weights the degree of dispersion for each of the periods by assigning a larger weight to the rotation position having a larger number of data items, and computes the final degree of dispersion based on a weighted degree of dispersion for each of the periods.

14. The tire air pressure monitor device according to claim 12, wherein
the wheel position determination unit calculates the final degree of dispersion based on the degree of dispersion for periods having a predetermined number or more of data items for the rotation position, from among the plurality of periods.

15. A tire air pressure monitor device that monitors air pressure in tires, the tire air pressure monitor device comprising:
a tire air pressure sensor configured to be installed on wheels of the tires to detect the air pressure in the tires;
a transmitter configured to be provided on each of the wheels to transmit via wireless signal the air pressure along with identification information inherent to the transmitter;
a receiver configured to be provided on a vehicle body to receive the wireless signal;
a rotation position calculation unit provided on the vehicle body to correspond to each of the wheels for detecting a rotation position of the wheel;
a wheel position determination unit that accumulates as rotation position data for the wheels, the rotation position of the wheels acquired a plurality of times when a wireless signal is transmitted including a certain identification information; and that determines wheel position corresponding to the rotation position data having a smallest degree of dispersion from among the rotation position data as the wheel position for the transmitter corresponding to the identification information, and
a wheel speed sensor that outputs a wheel speed pulse that is a proportion of a rotation speed of the wheel; and
the rotation position calculation unit detecting the rotation position of the wheel from a count value for the wheel speed pulse; and
the wheel position determination unit further including:
a first determination unit that before an accumulated travel time of the vehicle reaches a predetermined accumulated travel time computes a degree of dispersion of wheel position data when a number of data items for the rotation position data is a predetermined number or more; calculates the degree of dispersion among the wheel position data, and determines the wheel position corresponding to the rotation position data having the smallest degree of dispersion as the wheel position for the transmitter corresponding to a sensor ID; and
a second determination unit that when the accumulated travel time of the vehicle reaches the predetermined accumulated travel time, calculates the degree of dispersion among the wheel position data and determines the wheel position corresponding to the rotation position data having the smallest degree of dispersion as the wheel position for the transmitter corresponding to the sensor ID.

16. The tire air pressure monitor device according to claim 15, wherein
the wheel position determination unit converts the rotation position of each of the wheels to a vector with a start point at an origin of a two dimensional plane and an end point at a point on a circumference of a unit circle; calculates a scalar quantity of an average vector of the vectors for the rotation position data as a dispersion characteristic value; and compares the dispersion characteristic values and determines a degree of dispersion among the dispersion characteristic values.

17. The tire air pressure monitor device according to claim 16, wherein
the first determination unit determines the rotation position data corresponding to the highest value as having the smallest degree of dispersion when the highest value among the dispersion characteristic values X exceeds a first threshold.

18. The tire air pressure monitor device according to claim 17, wherein
the first determination unit determines the rotation position data corresponding to the highest value as having the smallest degree of dispersion if, when excluding the dispersion characteristic value having the highest value, all the dispersion characteristic values are below a second threshold which is smaller than the first threshold.

19. The tire air pressure monitor device according to claim 16, wherein
for each period when the wheels are traveling in an identical direction during a predetermined accumulated travel time, the second determination unit calculates a dispersion characteristic value among the rotation position data for an individual period based on the rotation position data acquired during the individual period, and calculates a total dispersion characteristic value among the rotation position data based on the dispersion characteristic values for the individual periods, and finally determines the rotation position data corresponding to the highest value total dispersion characteristic value among the total dispersion characteristic values as having the smallest degree of dispersion.

* * * * *